United States Patent
Shimomura et al.

(10) Patent No.: US 6,600,492 B1
(45) Date of Patent: Jul. 29, 2003

(54) PICTURE PROCESSING APPARATUS AND PICTURE PROCESSING METHOD

(75) Inventors: Tetsuya Shimomura, Hitachi (JP); Shigeru Matsuo, Hitachinaka (JP); Kazuyoshi Koga, Kodaira (JP); Koyo Katsura, Hitachiohta (JP); Yasuhiro Nakatsuka, Tokai-mura (JP); Kazushige Yamagishi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/292,375

(22) Filed: Apr. 15, 1999

(30) Foreign Application Priority Data

Apr. 15, 1998 (JP) .......................... 10-104342

(51) Int. Cl.$^7$ .............................................. G06T 15/00
(52) U.S. Cl. ...................... 345/501; 345/530; 345/531; 345/535
(58) Field of Search ................................ 345/501, 530, 345/531, 535, 502, 503, 504, 505, 538

(56) References Cited

U.S. PATENT DOCUMENTS

| | | | | |
|---|---|---|---|---|
| 5,155,600 A | * | 10/1992 | Maeda | 386/39 |
| 5,274,797 A | | 12/1993 | Barlow et al. | |
| 5,463,728 A | * | 10/1995 | Blahut et al. | 345/807 |
| 5,507,026 A | * | 4/1996 | Fukushima et al. | 345/568 |
| 5,642,124 A | * | 6/1997 | Kawai et al. | 345/1.1 |
| 5,706,034 A | | 1/1998 | Katsura et al. | |
| 5,717,440 A | * | 2/1998 | Katsura et al. | 345/513 |
| 5,796,960 A | * | 8/1998 | Bicevskis et al. | 345/555 |
| 5,838,370 A | * | 11/1998 | Kaji | 348/240 |
| 5,864,726 A | * | 1/1999 | Yamamoto | 396/429 |
| 6,005,690 A | * | 12/1999 | Suzuki et al. | 358/527 |
| 6,204,864 B1 | * | 3/2001 | Chee | 345/521 |

FOREIGN PATENT DOCUMENTS

| | | |
|---|---|---|
| JP | 4-84192 | 3/1992 |
| TW | 109542 | 3/1989 |

* cited by examiner

Primary Examiner—Matthew C. Bella
Assistant Examiner—Mackly Monestime
(74) Attorney, Agent, or Firm—Antonelli, Terry, Stout & Kraus, LLP

(57) ABSTRACT

In order to assure that a plurality of circuits such as a CPU I/F circuit, a rendering circuit, a video input circuit and a display circuit, which are each required to always complete a processing within a prescribed time, are each assured the ability to make as many accesses to a memory as required to complete the processing within the prescribed time, it is necessary to arbitrate a contention for an access to the memory through an internal bus among the circuits by employing a bus control circuit wherein priority levels assigned to the circuits to make an access to the internal bus are dynamically changed by comparing degrees of access urgency among the circuits. In this way, circuits that each have to always complete theirs processing within a prescribed time are assured the ability to make as many accesses to the memory as required to complete the processing within the prescribed time even if a plurality of such circuits do exist.

33 Claims, 20 Drawing Sheets

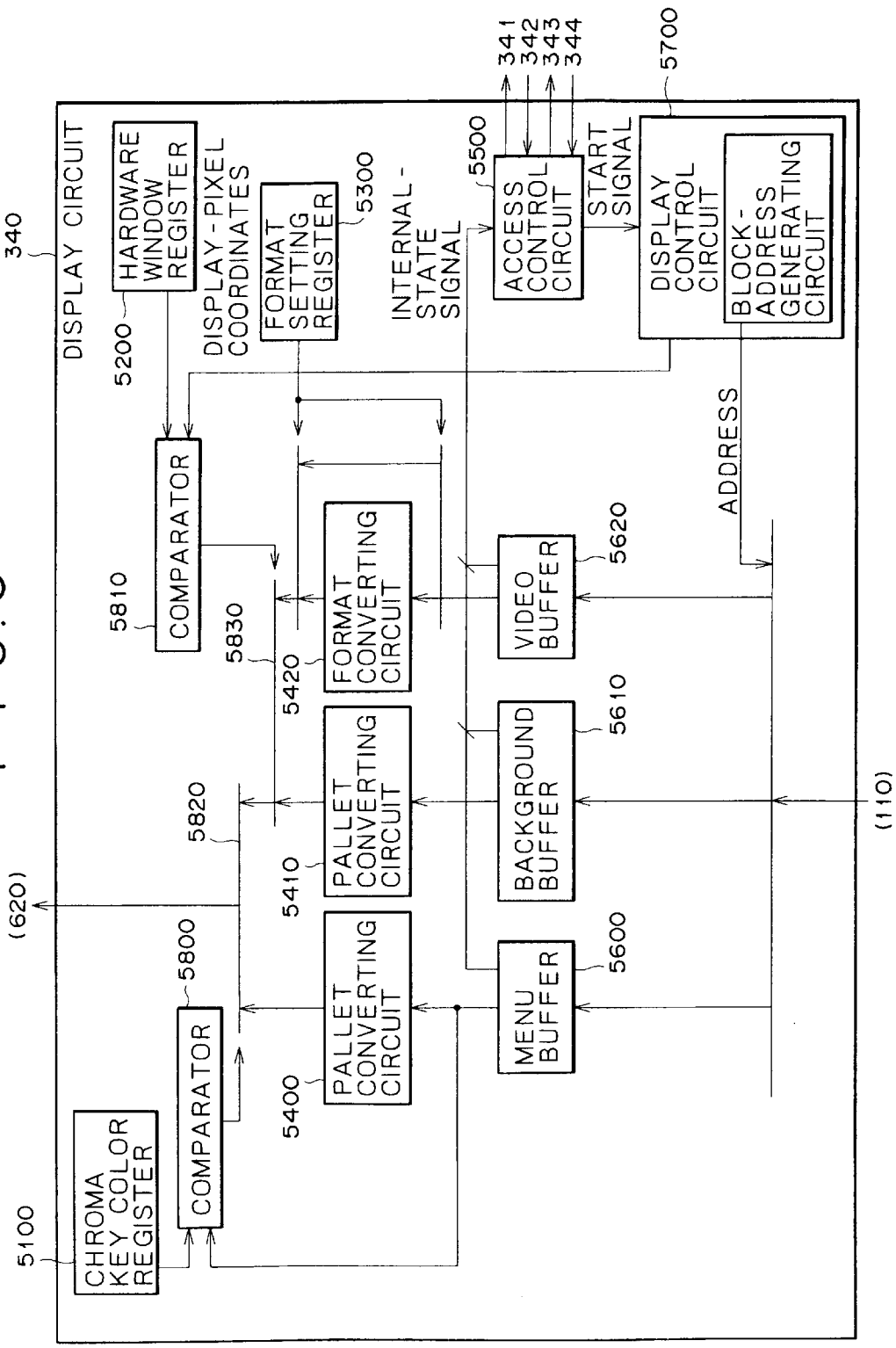

A : FIRST-PRIORITY-CIRCUIT SIGNAL OF THE A PRIORITY JUDGING CIRCUIT
B : SECOND-PRIORITY-CIRCUIT SIGNAL OF THE A PRIORITY JUDGING CIRCUIT
a : FIRST-PRIORITY-CIRCUIT SIGNAL OF THE B PRIORITY JUDGING CIRCUIT
b : SECOND-PRIORITY-CIRCUIT SIGNAL OF THE B PRIORITY JUDGING CIRCUIT

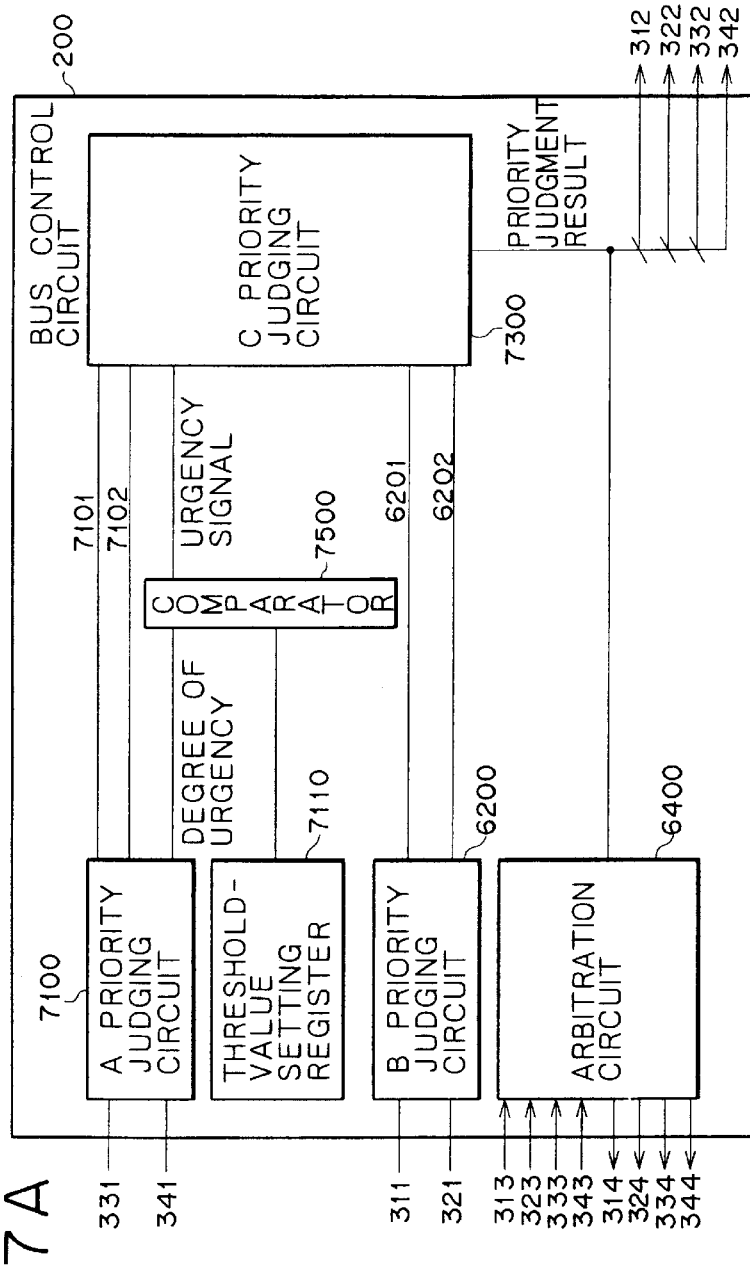
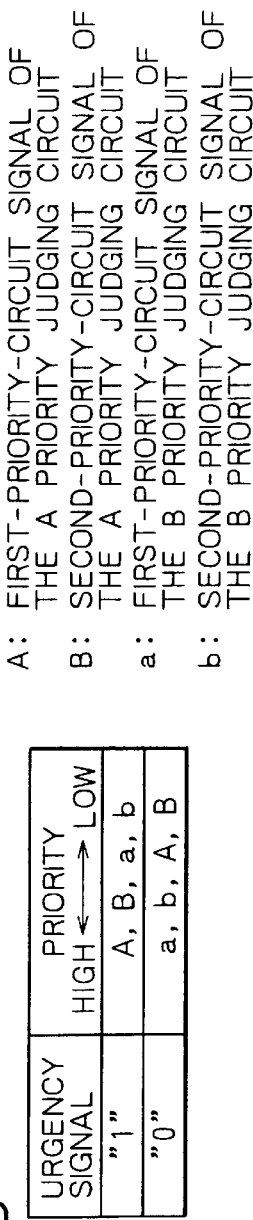
FIG. 7A
FIG. 7B

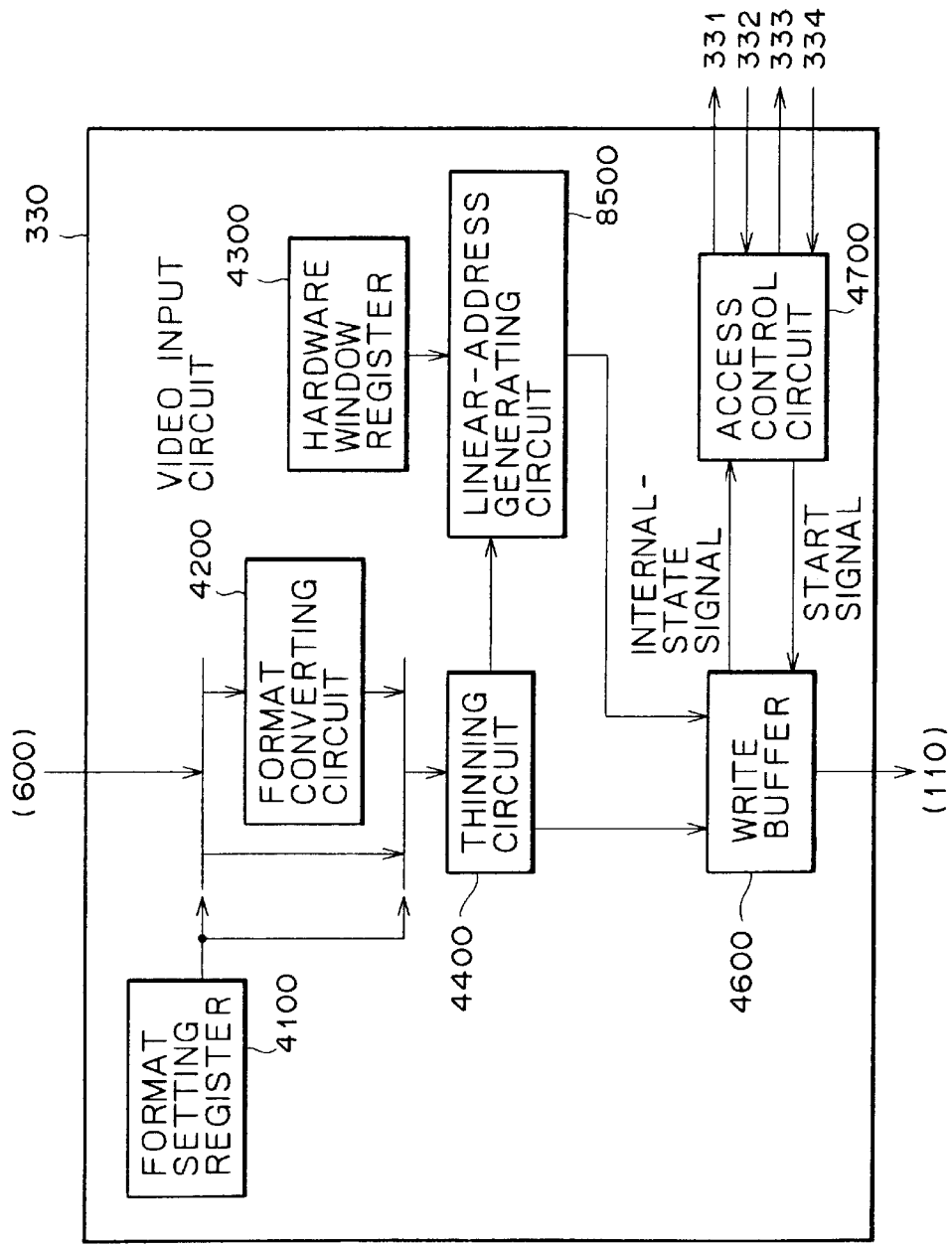

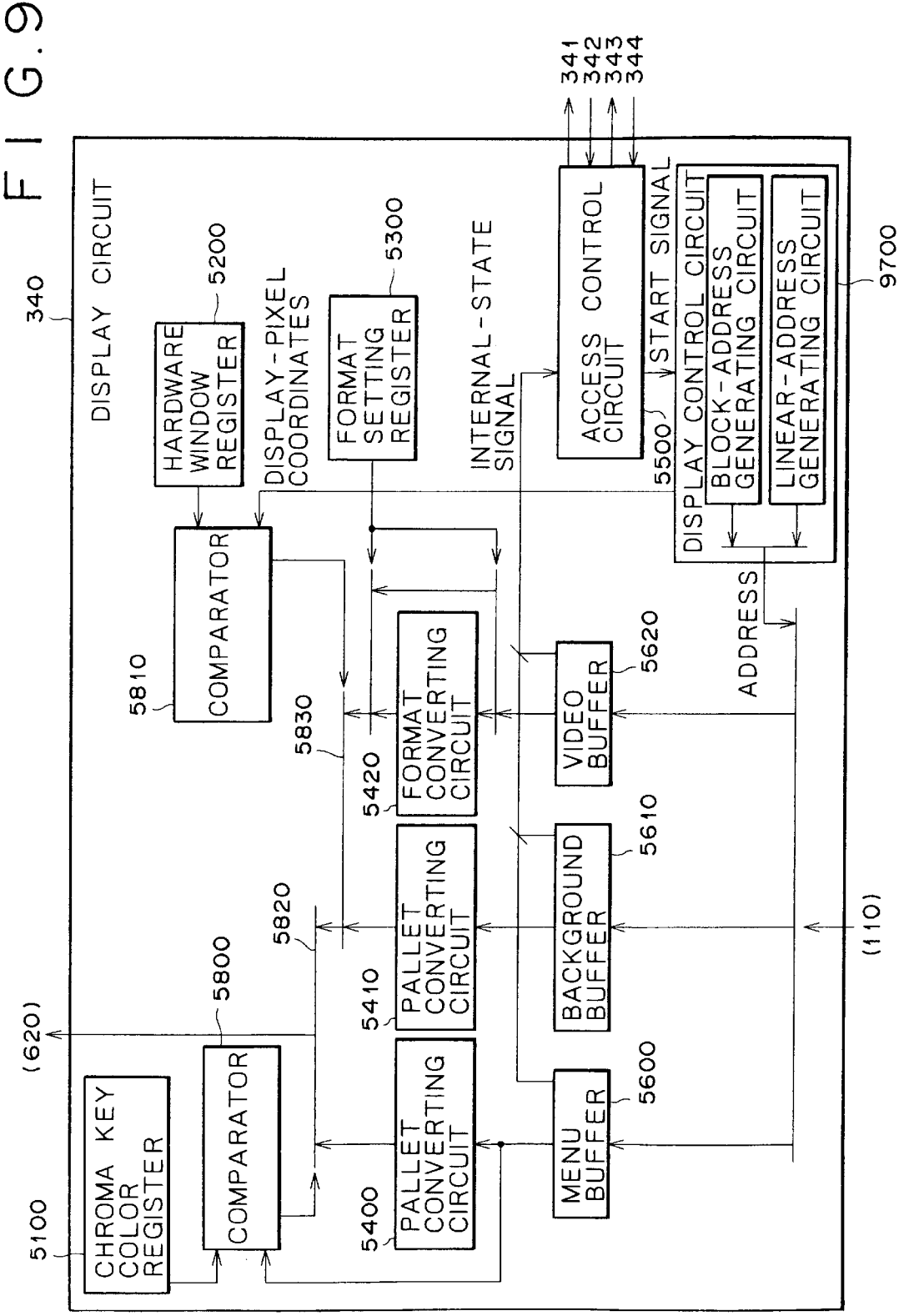

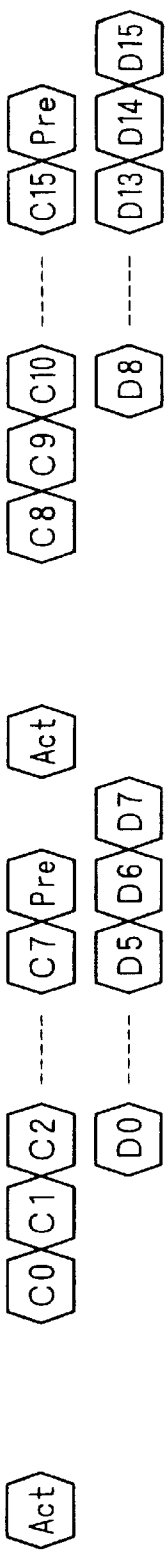
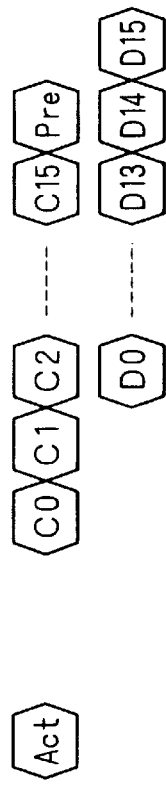

PICTURE PROCESSING APPARATUS AND PICTURE PROCESSING METHOD

BACKGROUND OF THE INVENTION

The present invention relates to a picture processing apparatus for generating and displaying characters and graphical data. More particularly, the present invention relates to a picture processing apparatus having an integrated memory system, wherein a frame buffer for storing pixel data to be displayed is integrated in a main storage device, and to a picture processing method embraced by the picture processing apparatus.

An example of a picture processing apparatus having an the integrated memory system based on the prior art is disclosed in JPA4-84192. In this system, a priority control signal is used for notifying a memory control unit that a display circuit is about to make an access to the memory, taking precedence over other circuits. In reference to the priority control signal, the memory control unit executes control to raise the priority level of the access to the memory to be made by the display circuit. Thus, in this memory system, the control of memory accesses is executed so as to never interrupt the display of a picture on a display unit, such as a CRT, even if the number of contentions for an access to the memory increases due to integration of the memories.

In the apparatus described above, the priority control signal is provided as a means to enable a circuit, which has to always complete processing within a prescribed time, to make access to the memory, taking precedence over other circuits.

In the apparatus described above, however, no consideration is given to a configuration including a plurality of circuits, each of which has to always complete processing within a prescribed time. For example, consider a configuration including a display circuit and a video input circuit, each of which has to always complete processing within a prescribed time. In such a configuration, the display circuit has to read out data to be displayed from a memory so as to display data on a CRT in an uninterrupted manner. On the other hand, the video input circuit has to always write video input data, which is received continuously, into the memory so that no part of the video input data is missed. To be more specific, the display circuit has to read out all of the data of one screen to be displayed from the memory within a period of time it takes to display one screen. Similarly, the video input circuit has to always write all of the video input data of one screen within a period of time it takes to obtain the video input data of one screen. In order to apply the features described above to the picture processing apparatus including such a display circuit and such a video input circuit, it is thus necessary to provide a priority control signal to each of the display circuit and the video input circuit. When both the display circuit and the video input circuit assert the priority control signals to the memory control unit at the same time, the memory control unit eventually lets the circuit having a higher priority make access to the memory, raising a problem that the other circuit is not assured of the ability to make as many accesses to the memory as required to complete its processing within the prescribed time, even if the other circuit also activates the priority control signal.

SUMMARY OF THE INVENTION

It is thus an object of the present invention to provide a picture processing apparatus having an integrated memory system and including a plurality of circuits, each of which is required to always complete its processing within a prescribed time, wherein the circuits are each assured of the ability to make as many accesses to the memory as required to complete its processing within the prescribed time.

In order to achieve the object described above, there is provided a picture processing apparatus having:

a CPU for carrying out processing;

a memory for storing processing results produced by the CPU and data to be displayed;

a display control circuit for making accesses to the memory and for controlling an operation to display the data stored in the memory;

a processing circuit for completing processing within a prescribed time by making accesses to the memory to read out the data to be displayed; and a bus control circuit for arbitrating a contention for an access to the memory between the display control circuit and the processing circuit, wherein:

the display control circuit and the processing circuit each have a means for outputting an internal-state signal representing an internal state thereof; and the bus control circuit determines which of the display control and the processing circuit is to be given a higher priority to make an access to the memory on the basis of the internal-state signals output by the display control and the processing circuit.

In addition, the object described above can also be achieved by providing a picture processing apparatus having:

a CPU for carrying out processing;

a first memory for storing processing results produced by the CPU;

a second memory for storing processing results produced by the CPU and data to be displayed;

a display control circuit for making accesses to the second memory and for controlling an operation to display the data stored in the second memory;

a processing circuit for completing processing within a prescribed time by making accesses to the second memory to read out the data to be displayed; and a bus control circuit for arbitrating a contention for an access to the second memory between the display control circuit and the processing circuit, wherein:

the display control circuit and the processing circuit each have a means for outputting an internal-state signal representing an internal state thereof; and the bus control circuit determines which of the display control and the processing circuit is to be given a higher priority to make an access to the second memory on the basis of the internal-state signals output by the display control and the processing circuit.

BRIEF DESCRIPTION OF THE DRAWINGS

FIG. 5 is a block diagram showing a first typical configuration of a display circuit 340 employed in the first embodiment;

FIGS. 7A and 7B are block diagrams showing a second typical configuration of the bus control circuit 200;

FIG. 8 is a block diagram showing a second typical configuration of the video input circuit 330;

FIG. 9 is a block diagram showing a second typical configuration of the display circuit 340;

FIGS. 14A and 14B are diagrams showing breakdowns of commands to make accesses to read out data at burst lengths of 8 and 16 respectively;

DETAILED DESCRIPTION OF THE PREFERRED EMBODIMENTS

The present invention will become more apparent from the following detailed description of various preferred embodiments with reference to the accompanying diagrams.

Figure 20:
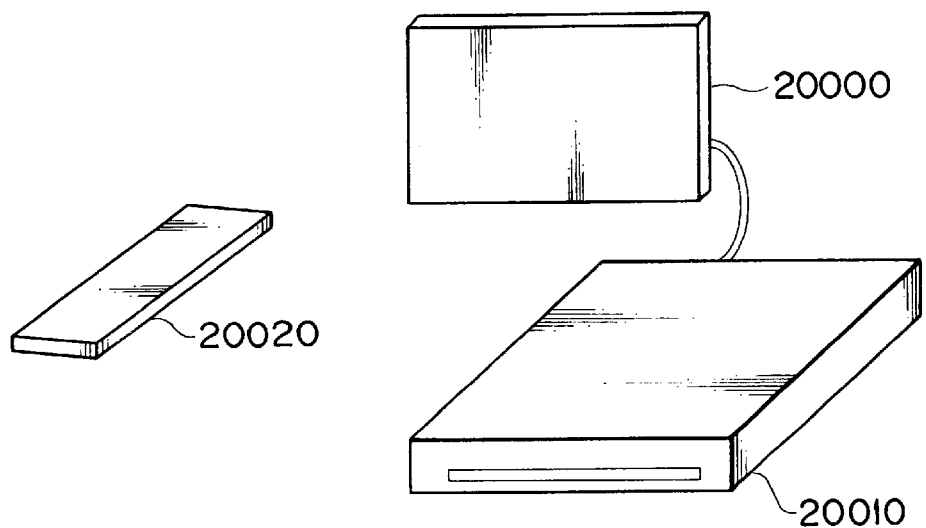
FIG. 20 is a diagram perspective view showing a navigation system according to the present invention.
Figure 21:
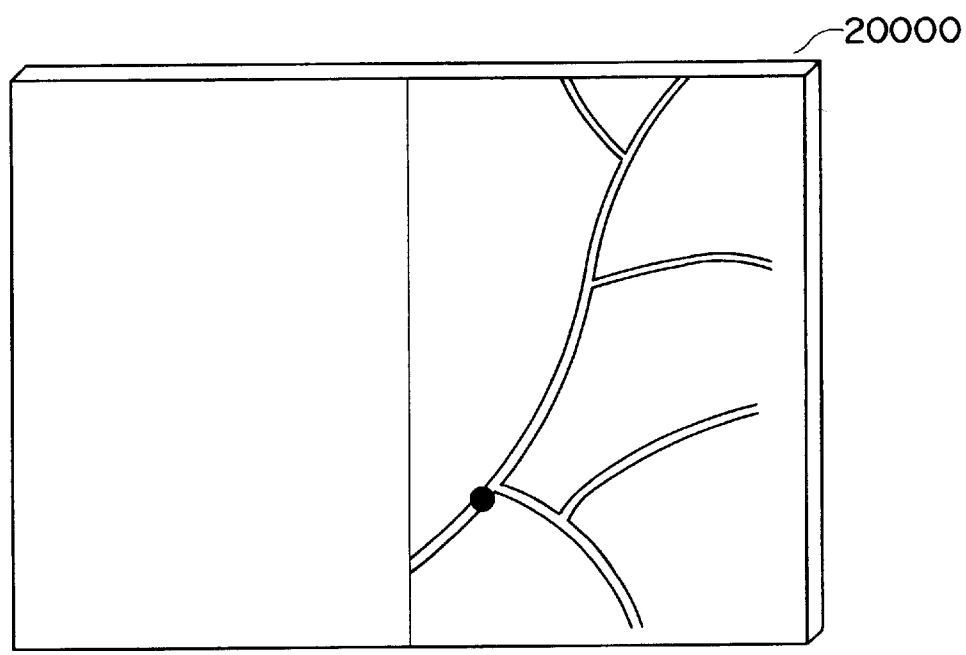
FIG. 21 is a diagram showing a typical screen display of the navigation system.

FIG. 20 is a diagram showing a navigation system employing a graphic processor provided by the present invention. As shown in the figure, the navigation system comprises a liquid-crystal display unit 20000, a picture processing apparatus 20010 and a remote controller 20020. The liquid-crystal display unit 20000 is used for displaying a map and video data of the type displayed by a television. The picture processing apparatus 20010 receives a television signal through an external antenna and generates video data to be displayed on the liquid-crystal display unit 20000 from the television signal. In addition, the picture processing apparatus 20010 also reads out map data stored in a CDROM and generates graphical data to be displayed on the liquid-crystal display unit 20000 from the map data. The remote controller 20020 is operated by a user to switch the screen display from one picture to another. FIG. 21 is a diagram showing a typical screen of data displayed on the liquid-crystal display unit 20000 of the navigation system. As shown in the figure, the liquid-crystal display unit 20000 is capable of displaying a map to the driver of a vehicle and video data to other passengers in the vehicle at the same time.

Figure 1:
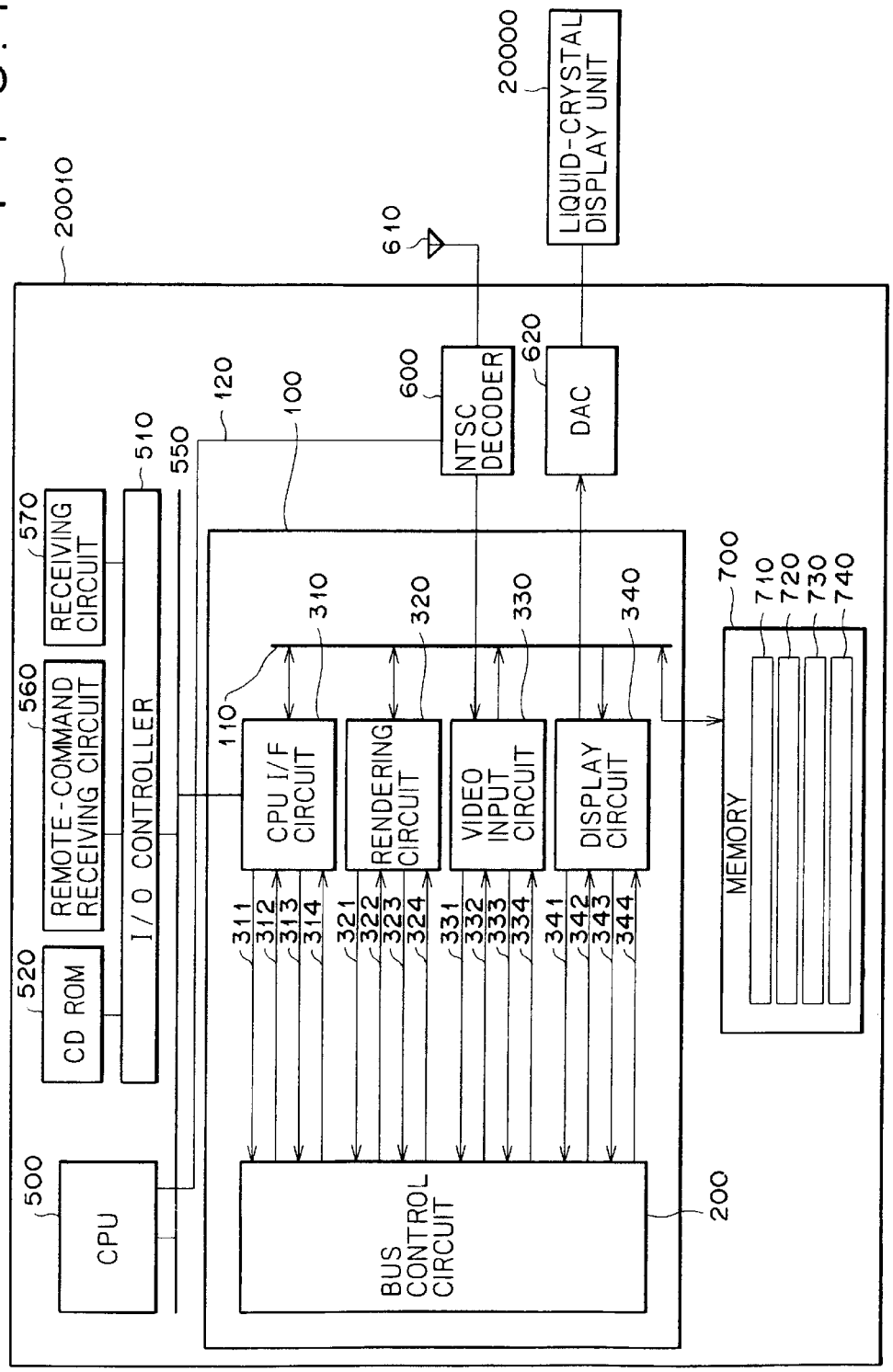
FIG. 1 is a block diagram showing an overall configuration of a first embodiment implementing a picture processing apparatus provided by the present invention.

FIG. 1 is a diagram showing the overall configuration of a first embodiment implementing the picture processing apparatus 20010. In the figure, reference numerals 100 and 110 denote a graphic processor and an internal bus, respectively. Reference numeral 200 denotes a bus control circuit and reference numeral 310 denotes a CPU I/F circuit. Reference numerals 320 and 330 denote a rendering circuit and a video input circuit, respectively. Reference numeral 340 denotes a display circuit, whereas reference numerals 311, 321, 331 and 341 each denote an internal-state signal. Reference numerals 312, 322, 332 and 342 each denote a priority determining result, whereas reference numerals 313, 323, 333 and 343 each denote a request. Reference numerals 314, 324, 334 and 344 each denote an acknowledgment, whereas reference numeral 500 denotes a CPU (Central Processing Unit). Reference numerals 510 and 520 denote an I/O controller and a CDROM, respectively. Reference numeral 560 denotes a remote-command receiving circuit and reference numeral 570 denotes a receiving circuit. Reference numerals 550 and 600 denote a CPU bus and an NTSC decoder, respectively. Reference numeral 610 denotes the external antenna cited earlier and reference numeral 620 denotes a DAC (Digital-to-Analog Converter). Reference numerals 20000 and 700 denote the liquid-crystal display unit described earlier and a memory unit, respectively. Reference numeral 710 denotes a main memory and reference numeral 720 denotes a storage area for storing rendering data. Reference numerals 730 and 740 denote a storage area for storing video input data and a frame buffer, respectively.

The main memory 710 employed in the picture processing apparatus 20010 shown in FIG. 1 is a work area used for storing information such as a program executed by the CPU 500 for carrying out processing and data required in the execution of the program. The rendering-data storage area 720 serves as a work area used for storing information such as a command and data required in the operation of the rendering circuit 320. The video input data stored in the video-input-data storage area 730 is generated by the video input circuit 330. The frame buffer 740 is an area used for storing data to be read out by the display circuit 340 and displayed on the liquid-crystal display unit 20000.

The memory unit 700 employed in the picture processing apparatus 20010 is designed to have a configuration which can be accessed by the CPU 500 through the CPU I/F circuit 310 as well as the rendering circuit 320, the video input circuit 330 and the display circuit 340 employed in the graphic processor 100 by using the internal bus 110 with the bus control circuit 200 serving as a means for arbitrating a contention for use of the internal bus 110 to make an access to the memory unit 700. By sharing the memory unit 700 among several components in this way, the memory unit 700 can be utilized with a high degree of efficiency.

Next, basic operations of the picture processing apparatus 20010 will be explained. In order to display the map of a destination on the liquid-crystal display unit 20000, the user enters information on the destination by operating the remote controller 20020. The information is entered interactively in accordance with commands appearing on the screen of the liquid-crystal display unit 20000. The information entered via the remote controller 20020 is passed on by the remote-command receiving circuit 560 to the CPU 500 by way of the CPU bus 550. In addition, the CPU 500 also acquires information on the present position of the vehicle from a sensor installed on the vehicle or from the receiving circuit 570 which receives a signal from a GPS. Then, the CPU 500 reads out required map data from the CDROM 520. The map data is selected on the basis of the information on the present position-of the vehicle and the position of the destination. Subsequently, the CPU 500 reads out a program stored in the memory unit 700 in order to display the map. The program is typically a program for displaying a map 3-dimensionally. The CPU 500 generates an instruction to be executed by the graphic processor 100 on the basis of the program, the information on the destination, the information on the present position of the vehicle and the map data. The generated instruction is then stored in the rendering-data storage area 720 of the memory unit 700 by way of the CPU bus 550, the CPU I/F circuit 310 and the internal bus 110. When a rendering process is started, the graphic processor 100 reads out the instruction which has been stored in the rendering-data storage area 720 of the memory unit 700 by the CPU 500. The rendering circuit 320 generates data to be displayed on the liquid-crystal display unit 20000 in accordance with the instruction and stores the data into the memory unit 700. The data stored in the memory unit 700 is then read out by the display circuit 340 employed in the graphic processor 100 so as to be displayed on the liquid-crystal display unit 20000. In an operation to display map data as described above, the rendering circuit 320 and the display circuit 340 make accesses to the memory unit 700. At that time, the bus control circuit 200 arbitrates contentions for accesses between the rendering circuit 320 and the display circuit 340.

In an operation to display video data conveyed by a television signal on the liquid-crystal display unit 20000, the user specifies a program to be displayed by operating the remote controller 20020. Information indicating the program to be displayed is supplied to the CPU 500 by way of the remote-command receiving circuit 560. In order to display a broadcasted program specified by the user, the CPU 500 transfers tuning information to an NTSC decoder 600 by way of a signal line 120. The NTSC decoder 600 selects a signal indicated by the tuning information from television signals, converting the selected television signal into RGB video data or luminance and chrominance signals to be stored in the video-input-data storage area 730 of the memory unit 700 as video data by way of the video input circuit 330. The video data stored in the memory unit 700 is read out by the display circuit 340 employed in the graphic processor 100 and displayed on the liquid-crystal display unit 20000. In an operation to display video data as described above, the video input circuit 330 and the display circuit 340 make separate accesses to the memory unit 700. At that time, the bus control circuit 200 arbitrates contentions for accesses between the video input circuit 330 and the display circuit 340.

In addition, in an operation to display map data and video data on the liquid-crystal display unit 20000, the rendering circuit 320, the video input circuit 330 and the display circuit 340 make separate accesses to the memory unit 700. At that time, the bus control circuit 200 arbitrates contentions for accesses among the rendering circuit 320, the video input circuit 330 and the display circuit 340.

Furthermore, if map data read out from the CDROM 520 can not all be stored in the memory unit 700, the CPU 500 stores only necessary map data into the memory unit 700 from time to time by way of the CPU I/F circuit 310. Further, the CPU 500 may read out a program from the memory unit 700 in order to do other processing by way of the CPU I/F circuit 310. In this case, in the picture processing apparatus 20010, the CPU I/F circuit 310, the rendering circuit 320, the video input circuit 330 and the display circuit 340 make separate accesses to the memory unit 700. At that time, the bus control circuit 200 arbitrates contentions for accesses among the CPU I/F circuit 310, the rendering circuit 320, the video input circuit 330 and the display circuit 340. The following is a description in concrete terms of the graphic processor 100 which arbitrates contentions for such accesses.

When the CPU I/F circuit 310 receives a request to use the internal bus 110 for making an access to the memory unit 700 from the CPU 500, the CPU I/F circuit 310 issues a request 313 to acquire a bus right to use the internal bus 110 for making an access to the memory unit 700 to the bus control circuit 200. When the CPU I/F circuit 310 receives an acknowledgment 314 output by the bus control circuit 200 in response to the request 313, an access to the memory unit 700 is made through the internal bus 110. If the access requested by the CPU 500 is a read access, data read out from the memory unit 700 is transferred to the CPU 500 by way of the CPU bus 550. If the access requested by the CPU 500 is a write access, on the other hand, data is written into the memory unit 700. To put it in detail, first of all, the CPU I/F circuit 310 outputs an internal-state signal 311 representing information on an elapsed time since the request to use the internal bus 110 for making an access to the memory unit 700 was received from the CPU 500 to the bus control circuit 200. If a result 312 of a judgment on a priority level output by the bus control circuit 200 to the CPU I/F circuit 310 in response to the internal-state signal 311 indicates that the priority level of the CPU I/F circuit 310 to use the internal bus 110 for making an access to the memory unit 700 is highest, the CPU I/F circuit 310 outputs the request 313 to use the internal bus 110 for making an access to the memory unit 700 immediately to the bus control circuit 200.

The rendering circuit 320 reads out a rendering command from the rendering-data storage area 720 to create graphic rendered data and stores the graphic rendered data in the frame buffer 740. Like the CPU I/F circuit 310, the rendering circuit 320 makes an access to the memory unit 700 by issuing a request 323 for a right to use the internal bus 110 for making an access to the memory unit 700 to the bus control circuit 200 and waiting for an acknowledgment 324 to be output by the bus control circuit 200 in response to the request 323. To put it in detail, first of all, the rendering circuit 320 compares an elapsed time since an internal buffer used as a read buffer became empty and an elapsed time since an buffer used as a write buffer became full, determining which elapsed time is longer. Then, the rendering circuit 320 outputs an internal-state signal 321 representing the longer elapsed time to the bus control circuit 200. If a result 322 of a judgment on a priority level output by the bus control circuit 200 to the rendering circuit 320 in response to the internal-state signal 321 indicates that the priority level of the rendering circuit 320 to use the internal bus 110 for making an access to the memory unit 700 is highest, the rendering circuit 320 outputs the request 323 to use the internal bus 110 for making an access to the memory unit 700 immediately to the bus control circuit 200.

The video input circuit 330 inputs digital data produced by the NTSC decoder 600 as a result of A-D conversion of video data received through the antenna 610. The video input circuit 330 is allowed to select an RGB format or a YC format as a format of the video data. The YC format is a format of video data comprising luminance and chrominance signals. In addition, it is also possible to thin the input video data in order to reduce the size of the data. The size of the video data needs to be reduced to display a picture within a picture. That is to say, a video screen is displayed as a child screen with a size smaller than the original size. In this case, the screen size of the input video data is adjusted to a display size so that the memory unit 700 can be utilized with a high degree of efficiency. The video input circuit 330 writes the input video data into the memory unit 700 while referencing a register showing the location of a video screen on the display screen of the liquid-crystal display unit 20000. Like the CPU I/F circuit 310 and the rendering circuit 320, the video input circuit 330 makes an access to the memory unit 700 to write input video data into the memory unit 700 by issuing a request 333 for a right to use the internal bus 110 for making an access to the memory unit 700 to the bus control circuit 200 and waiting for an acknowledgment 334 to be output by the bus control circuit 200 in response to the request 333. To put it in detail, first of all, the video input circuit 330 outputs an internal-state signal 331 indicating an estimated time, in which an internal buffer will be filled up with input video data, to the bus control circuit 200. If a result 332 of a judgment on a priority level output by the bus control circuit 200 to the video input circuit 330 in response to the internal-state signal 331 indicates that the priority level of the video input circuit 330 to use the internal bus 110 for making an access to the memory unit 700 is highest, the video input circuit 330 outputs the request 333 to use the internal bus 110 for making an access to the memory unit 700 immediately to the bus control circuit 200.

The display circuit 340 reads out data to be displayed and video input data from the memory unit 700 and outputs them to the liquid-crystal display unit 20000 by way of the DAC 620. To put it in detail, after the display circuit 340 reads out data to be displayed and video input data from the memory unit 700, the display circuit 340 outputs the data to the DAC 620 while referencing a register indicating the position of a video screen on the display screen of the liquid-crystal display unit 20000. Like the CPU I/F circuit 310, the rendering circuit 320 and the video input circuit 330, the display circuit 340 makes an access to the memory unit 700 to read out data to be displayed and video input data from the memory unit 700 by issuing a request 343 for a right to use the internal bus 110 for making an access to the memory unit 700 to the bus control circuit 200 and waiting for an acknowledgment 344 to be output by the bus control circuit 200 in response to the request 343. To put it in detail, first of all, the display circuit 340 outputs an internal-state signal 341 indicating a minimum of estimated times, in which internal buffers will become empty, to the bus control circuit 200. If a result 342 of a judgment on a priority level output by the bus control circuit 200 to the display circuit 340 in response to the internal-state signal 341 indicates that the priority level of the display circuit 340 to use the internal bus 110 for making an access to the memory unit 700 is highest, the display circuit 340 outputs the request 343 to use the internal bus 110 for making an access to the memory unit 700 immediately to the bus control circuit 200.

Receiving the internal-state signals 311, 321, 331 and 341, the bus control circuit 200 compares the degrees of urgency of accesses to the memory unit 700 to be made by the CPU I/F circuit 310, the rendering circuit 320, the video input circuit 330 and the display circuit 340 and arbitrates the contention for the use of the internal bus 110 by assigning priority levels to the CPU I/F circuit 310, the rendering circuit 320, the video input circuit 330 and the display circuit 340 so that, the higher will be the degree of urgency of an access to be made by a circuit, the higher the priority level assigned to the circuit. An outcome of the arbitration is output as the priority judgment results 312, 322, 332 and 342. As described earlier, a request 313, 323, 333, or 343 is then made respectively by the CPU I/F circuit 310, the rendering circuit 320, the video input circuit 330 or the display circuit 340 which is judged to have the highest priority level. In response to the request 313, 323, 333, or 343, the bus control circuit 200 issues an acknowledgment 314, 324, 334 or 334 to the CPU I/F circuit 310, the rendering circuit 320, the video input circuit 330 or the display circuit 340, respectively, as an indication that the CPU I/F circuit 310, the rendering circuit 320, the video input circuit 330 or the display circuit 340 is given a right to use the internal bus 110 for making an access to the memory unit 700.

As described above, the bus control circuit 200 compares the degrees of urgency of accesses to the memory unit 700 to be made by the CPU I/F circuit 310, the rendering circuit 320, the video input circuit 330 and the display circuit 340 by analyzing the internal-state signals 311, 321, 331 and 341 received from the CPU I/F circuit 310, the rendering circuit 320, the video input circuit 330 or the display circuit 340, respectively, in order to dynamically determines levels of priority to use the internal bus 110 for making an access to the memory unit 700 for the CPU I/F circuit 310, the rendering circuit 320, the video input circuit 330 and the display circuit 340. By arbitrating a contention for the use of the internal bus 110 and outputting an outcome of the arbitration in terms of the priority levels, a plurality of circuits, namely, the CPU I/F circuit 310, the rendering circuit 320, the video input circuit 330 and the display circuit 340, which are each supposed to complete its processing within a prescribed time, are each assured to be able to make as many accesses to the memory unit 700 as required to complete the processing within the prescribed time, so that the CPU I/F circuit 310, the rendering circuit 320, the video input circuit 330 and the display circuit 340 are each capable of completing its processing within the prescribed time even if there are a plurality of times at which the CPU I/F circuit 310, the rendering circuit 320, the video input circuit 330 and the display circuit 340 make an attempt to access the memory unit 700 simultaneously.

Figure 2:
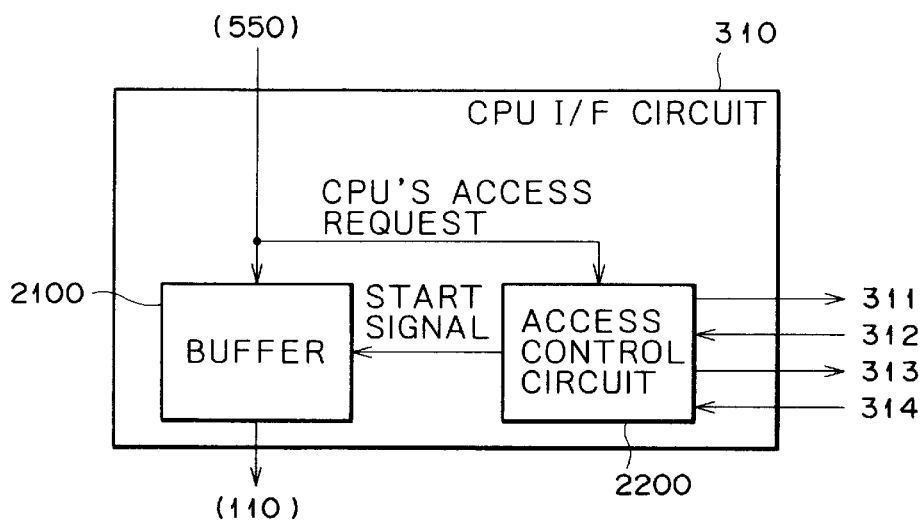
FIG. 2 is a block diagram showing a typical configuration of a CPU I/F circuit 310 employed in the first embodiment.

FIG. 2 is a diagram showing a typical configuration of the CPU I/F circuit 310 employed in the picture processing apparatus shown in FIG. 1. In the figure, reference numerals 2100 and 2200 denote a buffer and an access control circuit, respectively.

When the CPU I/F circuit 310 shown in FIG. 2 receives a request to use the internal bus 110 for making an access to the memory unit 700 from the CPU 500, an address or an address and data are stored in the buffer 2100 in the case of a read access or an access to write the data, respectively. In addition, the request for an access received from the CPU 500 is supplied to the access control circuit 2200. An elapsed time since the arrival of the access request is measured and an internal-state signal 311 representing the measured elapsed time is output to the bus control circuit 200. If a result signal 312 is received from the bus control circuit 200, the access control circuit 2200 issues a request 313 to use the internal bus 110 for making an access to the memory unit 700 to the bus control circuit 200. When an acknowledgment 314 is received from the bus control circuit 200 while the request 313 is still in the active state, a start signal is output to the buffer 2100 to output the address or the address and the data stored in the buffer 2100 to the internal bus 110 in the case of a read or write access respectively. To put it in detail, first of all, the access control circuit 2200 outputs the internal-state signal 311 to the bus control circuit 200. If a result 312 of a judgment on a priority level output by the bus control circuit 200 to the access control circuit 2200 in response to the internal-state signal 311 is interpreted by the access control circuit 2200 as a signal indicating that the CPU I/F circuit 310 has the highest priority to use the internal bus 110 for making an access to the memory unit 700, the access control circuit 200 outputs the request 313 to use the internal bus 110 for making an access to the memory unit 700 to the bus control circuit 200 immediately. In addition, the start signal is output to the buffer 2100 to output the address or the address and the data stored in the buffer 2100 to the internal bus 110 in the case of a read or write access, respectively, only after the acknowledgment 314 is output by the bus control circuit 200 to the access control circuit 2200 in response to the request 313 to indicate that a right to use the internal bus 110 for making an access to the memory unit 700 is granted to the CPU I/F circuit 310.

Figure 3:
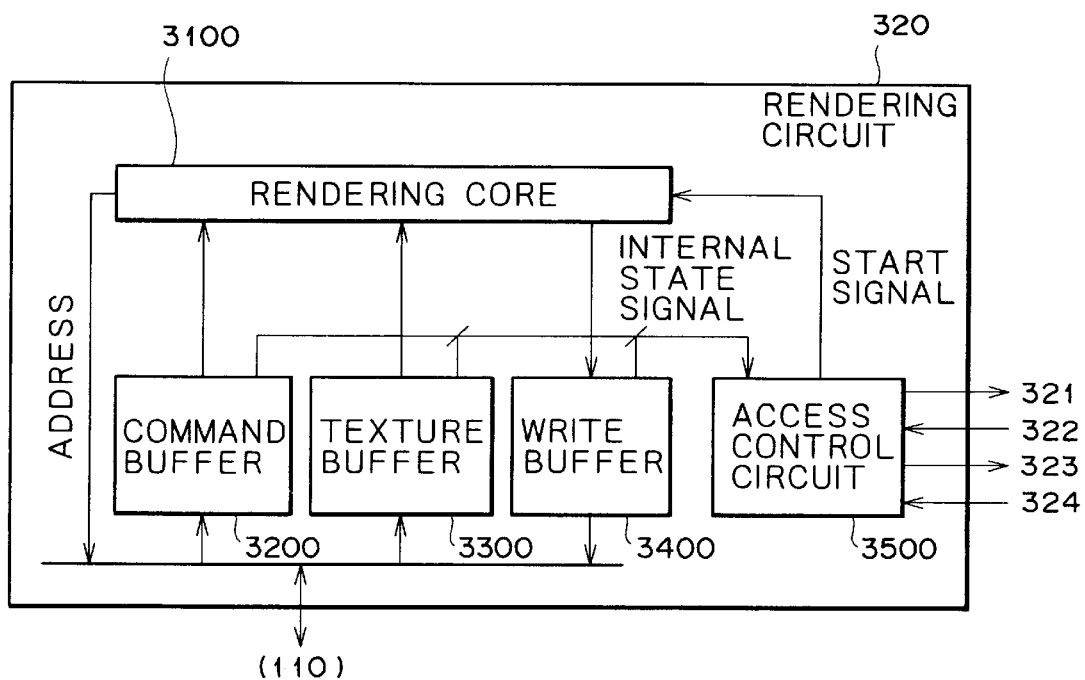
FIG. 3 is a block diagram showing a typical configuration of a rendering circuit 320 employed in the first embodiment.

FIG. 3 is a diagram showing a typical configuration of the rendering circuit 320 employed in the picture processing apparatus shown in FIG. 1. In the figure, reference numerals 3100 and 3200 denote a rendering core and a command buffer, respectively. Reference numeral 3300 denotes a texture buffer and reference numeral 3400 denotes a write buffer. Reference numeral 3500 denotes an access control circuit.

In the rendering circuit 320 shown in FIG. 3, the rendering core 3100 reads out a rendering command from the command buffer 3200. If a result of an analysis of the rendering command indicates that texture data is required, texture data is read out from the texture buffer 3300 to create graphical data. The graphical data is then written into the write buffer 3400 along with a write address. An internal-state signal representing an elapsed time since a rendering command was read out from the command buffer 3200 is output by the command buffer 3200 to the access control circuit 3500. By the same token, an internal-state signal representing an elapsed time since texture data was read out from the texture buffer 3300 is output to the access control circuit 3500. Likewise, an internal-state signal representing an elapsed time since graphical data was written by the rendering core 3100 into the write buffer 3400 is output to the access control circuit 3500. The access control circuit 3500 selects one signal representing the largest elapsed time from the three internal-state signals, outputting the selected one as the internal-state signal 321 to the bus control circuit 200. Then, the access control circuit 3500 issues a request 323 to use the internal bus 110 for making an access to the memory unit 700 to the bus control circuit 200. As an acknowledgment 324 is received from the bus control circuit 200 while the request 323 is still in the active state, the access control circuit 3500 outputs a start signal to the rendering core 3100. To put it in detail, first of all, the access control circuit 3500 outputs the internal-state signal 321 to the bus control circuit 200. If a result 322 of a judgment on a priority level output by the bus control circuit 200 to the access control circuit 3500 in response to the internal-state signal 321 is interpreted by the access control circuit 3500 as a signal indicating that the priority level of the rendering circuit 320 to use the internal bus 110 for making an access to the memory unit 700 is highest, the rendering circuit 320 outputs the request 323 to the bus control circuit 200 to use the internal bus 110 for making an access to the memory unit 700 immediately. As the acknowledgment 324 is received from the bus control circuit 200 in response to the request 323 to indicate that a right to use the internal bus 110 for making an access to the memory unit 700 is granted to the rendering circuit 320, the access control circuit 3500 outputs the start signal to the rendering core 3100 to let the rendering core 3100 make an access to the memory unit 700 by using the internal bus 110. If the access is an access to read out a command or texture data from the command buffer 3200 or the texture buffer 3300 respectively, the rendering core 3100 outputs an address to the internal bus 110 and then reads out a command or texture data which has been received from the internal bus 110 and stored in the command buffer 3200 or the texture buffer 3300. If the access is an access to write graphical data into the write buffer 3400, on the other hand, the rendering core 3100 outputs an address to the internal bus 110 through the write buffer 3400 and then writes the graphical data into the write buffer 3400 to be eventually output to the internal bus 110.

Figure 4:
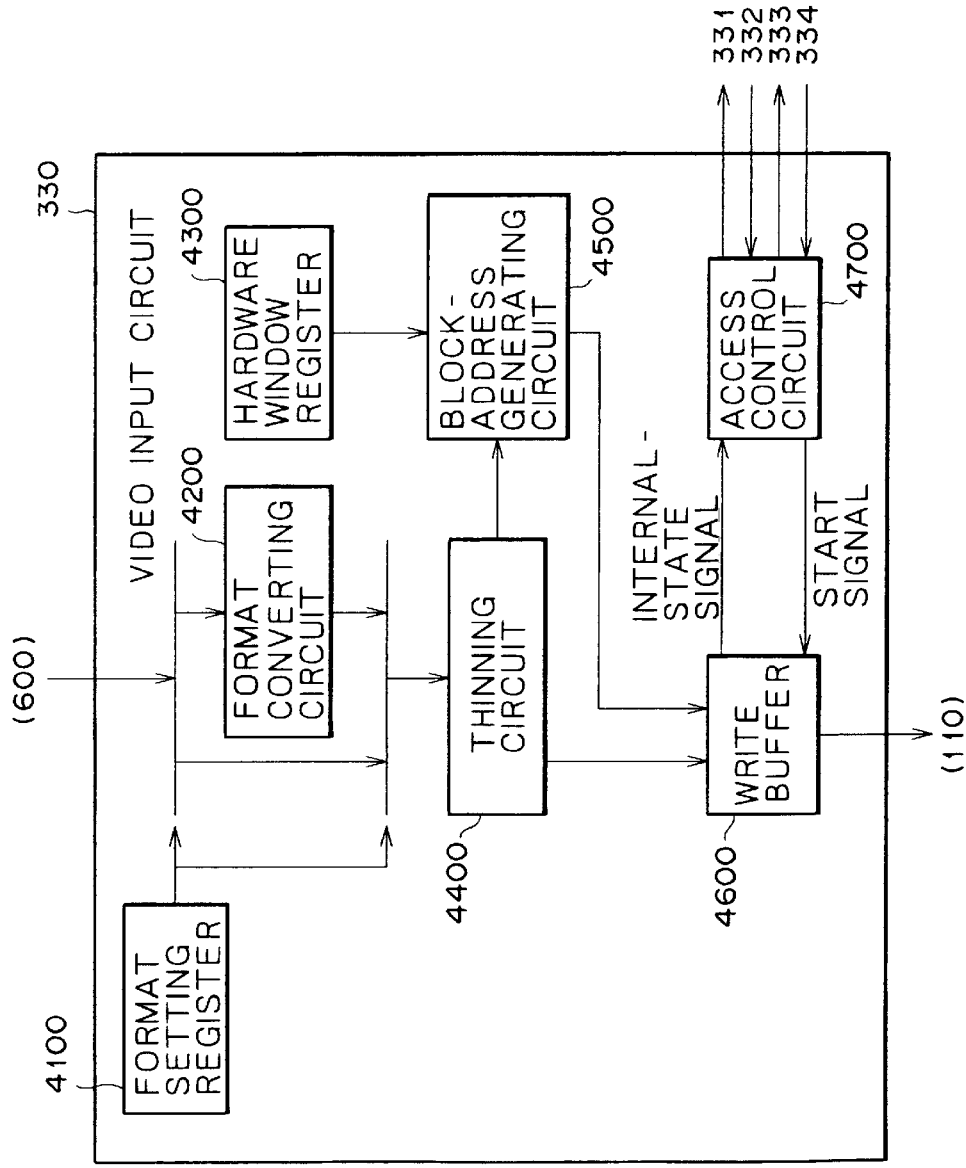
FIG. 4 is a block diagram showing a first typical configuration of a video input circuit 330 employed in the first embodiment.

FIG. 4 is a diagram showing a first typical configuration of the video input circuit 330 employed in the picture processing apparatus shown in FIG. 1. In the figure, reference numerals 4100 and 4200 denote a format setting register and a format converting circuit, respectively. Reference numeral 4300 denotes a hardware window register and reference numeral 4400 denotes a thinning circuit. Reference numerals 4500 and 4600 denote a block-address generating circuit and a write buffer, respectively. Reference numeral 4700 denotes an access control circuit. While the output format of the NTSC decoder 600 can be the RGB format or the YC format, the following description assumes that the output format is the YC format which is capable of expressing a larger number of colors by using a smaller number of bits.

In the video input circuit 330 shown in FIG. 4, the format setting register 4100 is a register for setting a data format in an operation to write video input data into the memory unit 700. The format setting register 4100 holds either the RGB format or the YC format into which the format of video input data received from the NTSC decoder 600 is to be converted. The format converting circuit 4200 is a circuit used for converting the format of data input from the NTSC decoder 600 into the RGB format. If the contents of the format setting register 4100 are the YC format, video input data input from the NTSC decoder is supplied to the thinning circuit 4400 with the 16-bit YC format unchanged. If the contents of the format setting register 4100 are the RGB format, on the other hand, the YC format of video data input from the NTSC decoder 600 is converted by the format converting circuit 4200 into a 16-bit RGB format before the video data is supplied to the thinning circuit 4400. In the thinning circuit 4400, the input video data is subjected to horizontal-direction data thinning and interpolation as well as vertical-direction data thinning and interpolation before being output to the write buffer 4600. The hardware window register 4300 is a register used for holding information on the position of a video screen on the display screen of the liquid-crystal display unit 20000. The block-address generating circuit 4500 generates a block address in the memory unit 700 to which the video data is to be transferred from the write buffer 4600. The block-address generating circuit 4500 generates a block address for the video data output by the thinning circuit 4400 by referencing the contents of the hardware window register 4300. The block address is also written into the write buffer 4600. The block address is an address of typically a continuous 512-byte space in the memory unit 700 to be allocated as a block-shaped area of 32 vertical pixels×16 horizontal pixels×8 bits on the screen of the liquid-crystal display unit 20000 so as to raise the speed of the memory access of the rendering circuit 320 as much as possible. By assigning addresses to such a block-shaped area in this way, the speed can be increased since a plurality of pixels can be written into a memory line that can be accessed by a one-time RAS address output even in an operation to render vertical straight lines for example. It should be noted that, in the case of linear mapping wherein pixels are assigned to a continuous memory space in a raster scan order from the left upper corner to the right lower corner on the screen of the liquid-crystal display unit 20000, in an operation to render a vertical straight line, only 1 pixel can be written into a memory line which can be accessed by a one-time RAS address output. The write buffer 4600 holds video data and an address output by the thinning circuit 4400 and the block-address generating circuit 4500. The write buffer 4600 outputs an internal-state signal representing an estimated time it takes to fill up the write buffer 4600 with input video data to the access control circuit 4700. When a start signal is received from the access control circuit 4700, the write buffer 4600 outputs the video data and the address held thereby to the internal bus 110. The access control circuit 4700 outputs the internal-state signal received from the write buffer 4600 to the bus control circuit 200 as an internal-state signal 331. The access control circuit 4700 further outputs a request 333 to use the internal bus 110 for making an access to the memory unit 700 to the bus control circuit 200 and, as an acknowledgment 334 is received from the bus control circuit 200 while the request 333 is still in the active state, the start signal is output to the write buffer 4600. To put it in detail, first of all, the access control circuit 4700 outputs the internal-state signal 331 to the bus control circuit 200. If a result 332 of a judgment on a priority level output by the bus control circuit 200 to the access control circuit 4700 in response to the internal-state signal 331 is interpreted by the access control circuit 4700 as a signal indicating that the priority level of the video input circuit 330 to use the internal bus 110 for making an access to the memory unit 700 is highest, the video input circuit 330 outputs the request 333 to the bus control circuit 200 to use the internal bus 110 for making an access to the memory unit 700 immediately. As the acknowledgment 334 is output by the bus control circuit 200 to the access control circuit 4700 in response to the request 333 to indicate that a right to use the internal bus 110 for making an access to the memory unit 700 is granted to the video input circuit 330, the access control circuit 4700 outputs the start signal to the write buffer 4600 to let the write buffer 4600 use the internal bus 110.

As described above, by writing input video data into the memory unit 700 at an address generated by the block-address generating circuit 4500, it is possible to input video data while suppressing increases in the amount of hardware used for generating an address in the display circuit 340.

FIG. 5 is a diagram showing a first typical configuration of the display circuit 340 employed in the picture processing apparatus shown in FIG. 1. In the figure, reference numerals 5100 and 5200 denote a chroma key color register and a hardware window register, respectively. Reference numeral 5300 denotes a format setting register. Reference numerals 5400 and 5410 each denote a pallet converting circuit, whereas reference numeral 5420 denotes a format converting circuit. Reference numerals 5500 and 5600 denote an access control circuit and a menu buffer, respectively. Reference numerals 5610 and 5620 denote a background buffer and a video buffer, respectively. Reference numeral 5700 denotes a display control circuit, whereas reference numerals 5800 and 5810 each denote a comparator. Reference numerals 5820 and 5830 each denote a selector. The display circuit 340 shown in FIG. 5 allows a plurality of screens to be displayed, with the screens overlapping each other. The menu buffer 5500 is used for holding graphical data (8-bit index color) to be displayed as the front-most screen and the background buffer 5510 is used for holding graphical data (8-bit index color) as the rear-most screen. The video buffer 5520 is used for holding video input data of the 16-bit YC or RGB format to be displayed between the graphical screen held in the menu buffer 5500 and the graphical screen held in the background buffer 5510.

The chroma key register 5100 employed in the display circuit 340 shown in FIG. 5 is a register used for holding a pallet number treated as a transparent color in the graphical data held in the menu buffer 5600. The hardware window register 5200 is a register used for holding information on the position of a video screen on the display screen of the liquid-crystal display unit 20000. The graphical data held in the menu buffer 5600 is converted by the pallet converting circuit 5400 from an 8-bit index color into a 16-bit direct color. Similarly, the graphical data held in the background buffer 5610 is converted by the pallet converting circuit 5410 from an 8-bit index color into a 16-bit direct color. If the contents of the format setting register 5300 are the YC format, the video input data held in the video buffer 5620 is converted by the format converting circuit 5420 from the 16-bit YC format into the 16-bit RGB format. If the contents of the format setting register 5300 are the RGB format, on the other hand, the video input data held in the video buffer 5620 is output as it is with no format conversion. The comparator 5810 compares display pixel coordinates output by the display control circuit 5700 with the contents of the hardware window register 5200. If the display pixel coordinates are within the video screen, the selector 5830 is driven by the comparator 5810 to output the video input data to the selector 5820. Otherwise, the selector 5830 is driven by the comparator 5810 to pass on the graphical data output by the pallet converting circuit 5410 to the selector 5820. The graphical data held in the menu buffer 5600 is supplied to the comparator 5800 which then compares the graphical data with the contents of the chroma key color register 5100 to determine whether or not the graphical data is a transparent color. If the graphical data held in the menu buffer 5600 is a transparent color, the selector 5820 is driven by the comparator 5800 to pass on the data output by the selector 5830 to the DAC 620. Otherwise, the selector 5820 is driven by the comparator 5800 to pass on the data output by the pallet converting circuit 5400 to the DAC 620. The menu buffer 5600, the background buffer 5610 and the video buffer 5620 each output an internal-state signal to the access control circuit 5500. The internal-state signals represent an estimated time within which the contents of the menu buffer 5600, the background buffer 5610 and the video buffer 5620 become empty. The access control circuit 5500 determines which of the internal-state signals output by these 3 buffers represents the shortest time and outputs the internal-state signal representing the shortest time to the bus control circuit 200 as the internal-state signal 341. The access control circuit 5500 further outputs the request 343 to use the internal bus 110 for making an access to the memory unit 700 to the bus control circuit 200. As the acknowledgment 344 is received from the bus control circuit 200 while the request 343 is still in an active state, the access control circuit 5500 outputs a start signal to the display control circuit 5700. To put it in detail, first of all, the access control circuit 5500 outputs the internal-state signal 341 indicating the minimum of the estimated times to the bus control circuit 200. If a result 342 of a judgment on a priority level output by the bus control circuit 200 to the access control circuit 5500 in response to the internal-state signal 341 is interpreted by the access control circuit 5500 as a signal indicating that the priority level of the display circuit 340 to use the internal bus 110 for making an access to the memory unit 700 is highest, the access control circuit 5500 outputs the request 343 to use the internal bus 110 for making an access to the memory unit 700 to the bus control circuit 200 immediately. When the acknowledgment 344 is output by the bus control circuit 200 to the access control circuit 5500 in response to the request 343 to indicate that the right to use the internal bus 110 for making an access to the memory unit 700 is granted to the display circuit 340, the start signal is output to the display control circuit 5700 and an access to the internal bus 110 is made. Receiving the start signal, the display control circuit 5700 outputs coordinates of display pixels on the screen of the liquid-crystal display unit 20000 as display-pixel coordinates in synchronization with raster scanning over the liquid-crystal display unit 20000. In addition, when the start signal is received from the access control circuit 5500, the display control circuit 5700 outputs an address to the internal bus 110 and then loads data read-out from the memory unit 700 by way of the internal bus 110 into the menu buffer 5600, the background buffer 5610 or the video buffer 5620.

In the display circuit 340, the contents of the chroma key color register 5100 are compared with the data held in the menu buffer 5600, whereas the contents of the hardware window register 5200 are compared with display-pixel coordinates, as described above, and, depending on results of the comparisons, data held in the menu buffer 5600, the background buffer 5610 or the video buffer 5620 is read out to be displayed on the screen of the liquid-crystal display unit 20000. It is thus possible to display 16-bit data overlapping 8-bit data and further display 8-bit data with any arbitrary shape superposing them.

Figures 6A, 6B:
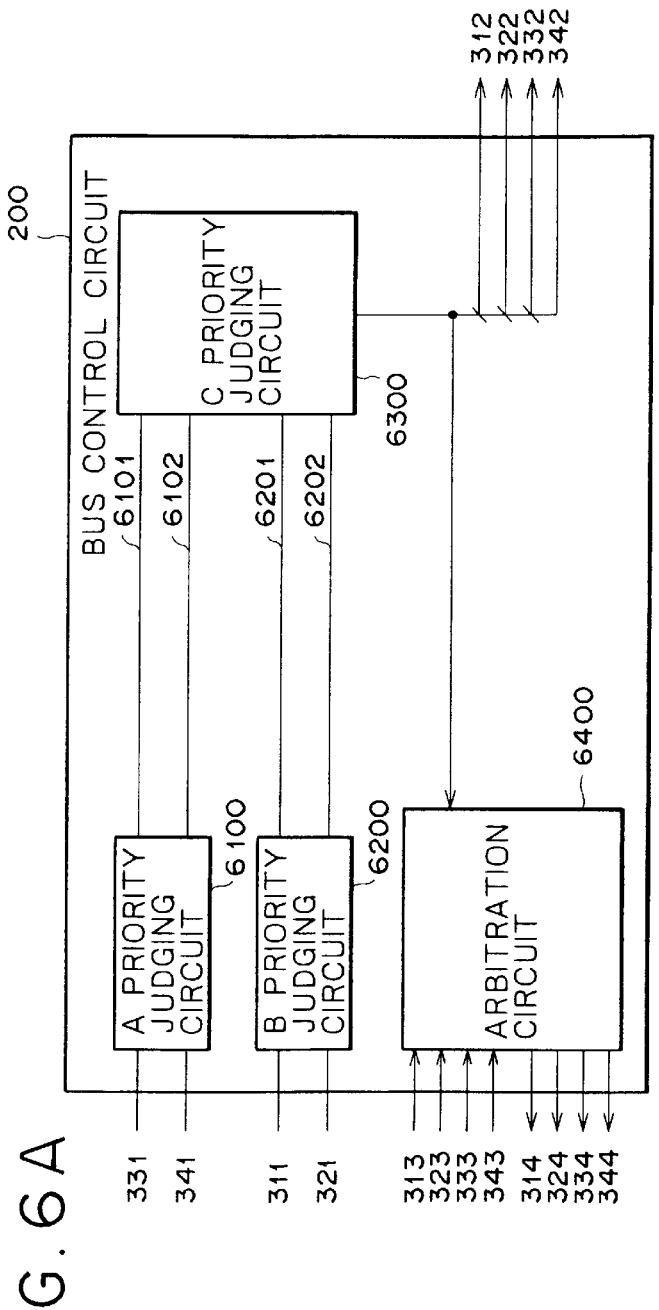
FIGS. 6A and 6B are block diagrams showing a first typical configuration of a bus control circuit 200 employed in the first embodiment.

FIGS. 6A and 6B are diagrams showing a first typical configuration of the bus control circuit 200 employed in the picture processing apparatus shown in FIG. 1. In FIG. 6A, reference numerals 6100 and 6200 denote an A priority judging circuit and a B priority judging circuit, respectively. Reference numeral 6300 denotes a C priority judging circuit and reference numeral 6400 denotes an arbitration circuit.

In the bus control circuit 200 shown in FIG. 6A, the internal-state signals 331 and 341 generated by the video input circuit 330 and the display circuit 340, respectively, are supplied to the A priority judging circuit 6100 to be compared with each other. As a result of the comparison, the internal-state signal 331 or 341 representing the smaller value is output as a first priority-circuit signal 6101, while the other is output as a second priority-circuit signal 6102. Similarly, the internal-state signals 311 and 321 generated by the CPU I/F circuit 310 and the rendering circuit 320, respectively, are supplied to the B priority judging circuit 6200 to be compared with each other. As a result of the comparison, the internal-state signal 311 or 321 representing the smaller value is output as a first priority-circuit signal 6201, while the other is output as a second priority-circuit signal 6202. The priority-circuit signals 6101, 6102, 6201 and 6202 are further supplied to the C priority judging circuit 6300 which then outputs the results 312, 322, 332 and 342 of a judgment on the priority levels indicating that the priority-circuit signals 6101, 6102, 6201 and 6202 represent circuits with first, second, third and fourth priority levels, respectively, as shown in FIG. 6B. The priority-level-judgment results 312, 322, 332 and 342 are also supplied to the arbitration circuit 6400 which then assigns priority levels to the requests 313, 323, 333 and 343 on the basis of the priority-level-judgment results 312, 322, 332 and 342, outputting the acknowledgment 314, 324, 334 or 344 to the CPU I/F circuit 310, the rendering circuit 320, the video input circuit 330 or the display circuit 340, respectively, to grant a right to make an access to the memory unit 700 through the internal bus 110.

As described above, the C priority judging circuit 6300 always assigns higher priorities to the video input circuit 330 and the display circuit 340, the priority levels of which are compared with each other by the A priority judging circuit 6100, than the CPU I/F circuit 310 and the rendering circuit 320, the priority levels of which are compared with each other by the B priority judging circuit 6200. As a result, it is possible to prevent the video input circuit 330 or the display circuit 340, which each have to always complete its processing within a prescribed time, from entering a state of waiting for a right to use the internal bus 110 for making an access to the memory unit 700 due to a request for a memory access made by the CPU I/F circuit 310 or the rendering circuit 320 having no prescribed time to complete its processing in particular.

FIGS. 7A and 7B are diagrams showing a second typical configuration of the bus control circuit 200 employed in the picture processing apparatus shown in FIG. 1. In FIG. 7A, reference numerals 7100 and 7110 denote an A priority judging circuit and a threshold-value setting register, respectively. Reference numeral 7300 denotes a C priority judging circuit and reference numeral 7500 denotes a comparator.

In the bus control circuit 200 shown in FIG. 7A, the internal-state signals 331 and 341 generated by the video input circuit 330 and the display circuit 340, respectively, are supplied to the A priority judging circuit 7100 to be compared with each other. As a result of the comparison, the internal-state signal 331 or 341 representing the smaller value is output as a first priority-circuit signal 7101, while the other is output as a second priority-circuit signal 7102. The A priority judging circuit 7100 also outputs the smaller value as a signal indicating a degree of urgency. Like the first configuration shown in FIG. 6A, the internal-state signals 311 and 321 generated by the CPU I/F circuit 310 and the rendering circuit 320, respectively, are supplied to the B priority judging circuit 6200 to be compared with each other. As a result of the comparison, the internal-state signal 311 or 321 representing the smaller value is output as a first priority-circuit signal 6201, while the other is output as a second priority-circuit signal 6202. The threshold-value setting register 7110 is a register used for holding a threshold value serving as a criterion to swap the pair comprising the CPU I/F circuit 310 and the rendering circuit 320, the priority levels of which are compared with each other by the B priority judging circuit 6200, with the pair comprising the video input circuit 330 and the display circuit 340, the priority levels of which are compared with each other by the A priority judging circuit 7100, in the final assignment of priorities. To put it in detail, the signal representing the degree of urgency generated by the A priority judging circuit 7100 is compared with the contents of the threshold-value setting register 7110 by the comparator 7500. If the former is found to be smaller than the latter, the comparator 7500 outputs an urgency signal with a logic value of "1" to the C priority judging circuit 7300. Otherwise, the comparator 7500 resets the urgency signal at a logic value of "0". If the urgency signal has the logic value of "1", the C priority judging circuit 7300 outputs the results 312, 322, 332 and 342 of a judgment on the priority levels indicating that the priority-circuit signals 7101, 7102, 6201 and 6202 represent circuits with first, second, third and fourth priority levels, respectively, as shown in FIG. 7B. If the urgency signal has the logic value of "0", on the other hand, the C priority judging circuit 7300 outputs the results 312, 322, 332 and 342 of a judgment on the priority levels indicating that the priority-circuit signals 6201, 6202, 7101 and 7102 represent circuits with first, second, third and fourth priority levels, respectively, swapping a pair comprising the priority-circuit signals 7101 and 7102 with a pair comprising the priority-circuit signals 6201 and 6202.

As described above, the signal representing the degree of urgency generated by the A priority judging circuit 7100 is compared with the contents of the threshold-value setting register 7110 by the comparator 7500. If the result of the comparison indicates that there will be no problem even if an access to the memory unit 700 by using the internal bus 110 is not made immediately by the video input circuit 330 or the display circuit 340, the priority levels of which are compared with each other by the A priority judging circuit 7100, the priority levels the CPU I/F circuit 310 and the rendering circuit 320, the priority levels of which are compared with each other by the B priority judging circuit 6200, are raised over the video input circuit 330 and the display circuit 340. Thus, when the video input circuit 330 and the display circuit 340, which each have to always complete its processing within a prescribed time, have time which is more than enough for completing the processing, a right to make an access to the memory unit 700 through the internal bus 110 can be granted to the CPU I/F circuit 310 or the rendering circuit 320 having no prescribed time to complete its processing in particular. As a result, the performance of the picture processing apparatus can be improved while the video input circuit 330 and the display circuit 340, which each have to always complete its processing within a prescribed time, are still assured of being able to make as many accesses to the memory unit 700 as required to complete the processing within the prescribed time.

FIG. 8 is a diagram showing a second typical configuration of the video input circuit 330 employed in the picture processing apparatus shown in FIG. 1. In the figure, reference numeral 8500 denotes a linear-address generating circuit.

In the video input circuit 330 shown in FIG. 8, the linear-address generating circuit 8500 generates a linear address matching the video data output by the thinning circuit 4400 by referencing the contents of the hardware window register 4300. The linear address is written into the write buffer 4600. The linear address is an address in the memory unit 700 at which the video data is to be transferred from the write buffer 4600. Receiving a start signal generated by the access control circuit 4700, the write buffer 4600 outputs the linear address and the video data to the internal bus 110.

By writing input video data into the memory unit 700 at a linear address generated by the linear-address generating circuit 8500 as described above, the memory unit 700 can be utilized with a high degree of efficiency. To put it in detail, consider a case in which the linear address is an address of typically a continuous 512-byte memory space to be allocated as a block-shaped area of 16 vertical pixels×16 horizontal pixels×16 bits on the screen of the liquid-crystal display unit 20000. In this case, input video data of 320 horizontal pixels×240 vertical pixels which are a multiple of a block of 16 horizontal pixels×16 vertical pixels can also be mapped onto the memory without waste even using a block address. In the case of input video data of 100 horizontal pixels×80 vertical pixels which are not a multiple of a block of 16 horizontal pixels×16 vertical pixels, on the other hand, mapping onto the memory using a block address will result in waste. With linear mapping, however, input video data can also be mapped onto the memory without waste without regard to the size of the data. That is to say, the linear mapping allows the memory to be used with a higher degree of efficiency than the block mapping.

FIG. 9 is a diagram showing a second typical configuration of the display circuit 340 employed in the picture processing apparatus shown in FIG. 1. In the figure, reference numeral 9700 denotes a display control circuit.

In the display circuit 340 shown in FIG. 9, the display control circuit 9700 outputs coordinates of display pixels on the screen of the liquid-crystal display unit 20000 as display-pixel coordinates in synchronization with raster scanning over the liquid-crystal display unit 20000. When a start signal is received from the access control circuit 5500, the display control circuit 9700 outputs a block address to the internal bus 110 in the case of an access to the memory unit 700 to read out data into the menu buffer 5600 or the background buffer 5610, or outputs a linear address to the internal bus 110 in the case of an access to the memory unit 700 to read out data into the video buffer 5620, and loads the data read out from the memory unit 700 through the internal bus 110 into the menu buffer 5600, the background buffer 5610 or the video buffer 5620.

By having the display control circuit 9700 generate either a block address or a linear address which is selected in accordance with the type of data to be accessed as described above, the memory unit 700 can be utilized effectively.

Figure 22:
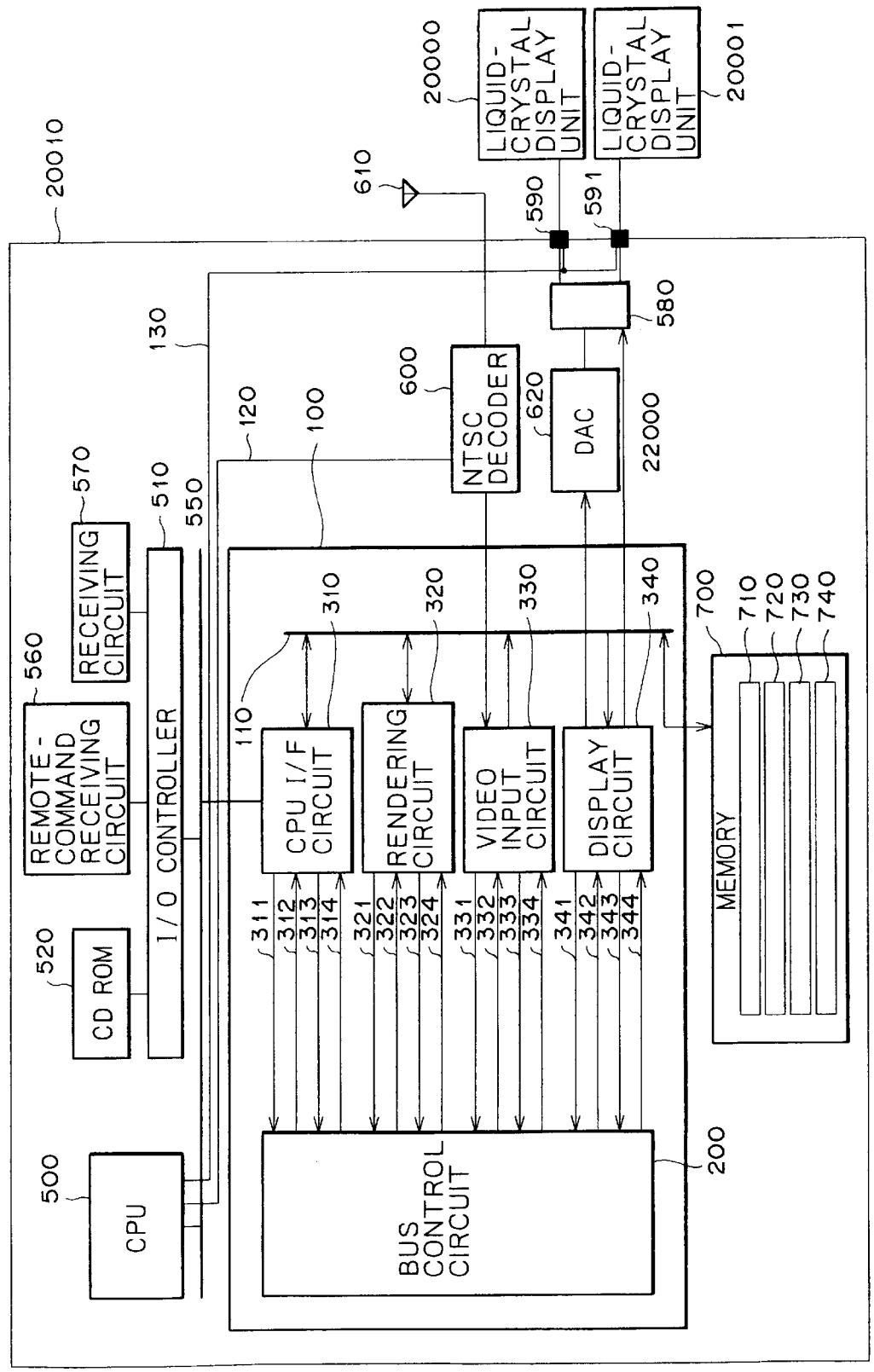
FIG. 22 is a block diagram showing a modification of the first embodiment implementing the picture processing apparatus provided by the present invention.

FIG. 22 is a diagram showing the configuration of a picture processing apparatus 20010 for displaying map data and video data on separate liquid-crystal display units. As shown in the figure, the picture processing apparatus 20010 is provided with 2 pins 590 and 591 so that map data and video data can be displayed on the separate liquid-crystal display units 20000 and 20001 connected to the pins 590 and 591, respectively. A signal line for outputting data to be displayed from the graphic processor 100 is connected to the pins 590 and 591 through a switch 580. The switch 580 is controlled by a switch signal 22000 output by the display circuit 340 employed in the graphic processor 100 so that, when the display circuit 340 reads out map data from the memory unit 700, the map data is displayed on the liquid-crystal display unit 20000 and, when the display circuit 340 reads out video data from the memory unit 700, the video data is displayed on the other liquid-crystal display unit 20001. In addition, if only one of the pins 590 and 591 is used, map data and video data can be displayed on one of the liquid-crystal display units 20000 and 20001 at the same time. In the present picture processing apparatus 20010, the pins 590 and 591 connected to the liquid-crystal display units are connected to the CPU 500 by a signal line 130 used for informing the CPU 500 of whether or not the pins 590 and 591 are connected to the liquid-crystal display units 20000 and 20001, respectively. Notified of information on whether or not the pins 590 and 591 are connected to the liquid-crystal display units 20000 and 20001, respectively, the CPU 500 transmits a control signal conveying the following values to the display circuit 340.

| Pin 590 | Pin 591 | Control signal value |
|---|---|---|
| 0 (Not connected) | 0 (Not connected) | 00 |
| 1 (Connected) | 0 (Not connected) | 10 |
| 0 (Not connected) | 1 (Connected) | 01 |
| 1 (Connected) | 1 (Connected) | 11 |

The display circuit 340 outputs the switch signal 22000 to the switch 580 in accordance with the value of the control signal shown above. To be more specific, if the value of the control signal is 10, the display circuit 340 outputs the switch signal 22000 to drive the switch 580 to output data to be displayed to the pin 590. If the value of the control signal is 01, the display circuit 340 outputs the switch signal 22000 to drive the switch 580 to output data to be displayed to the pin 591. If the value of the control signal is 11, the display circuit 340 outputs the switch signal 22000 to drive the switch 580 to output map data to the pin 590 and video data to the pin 591. So far, embodiments applied to a navigation system have been described. It should be noted that, by connecting the I/O controller 510 to a keyboard and a mouse, the apparatus can also be used as a computing machine of the type known generally as a computer. In addition, a CRT display can be employed in place of the liquid-crystal display unit. It is also worth noting that, in the case of a liquid-crystal display unit which is capable of handling a digital signal, the DAC 620 is not required.

Figure 10:
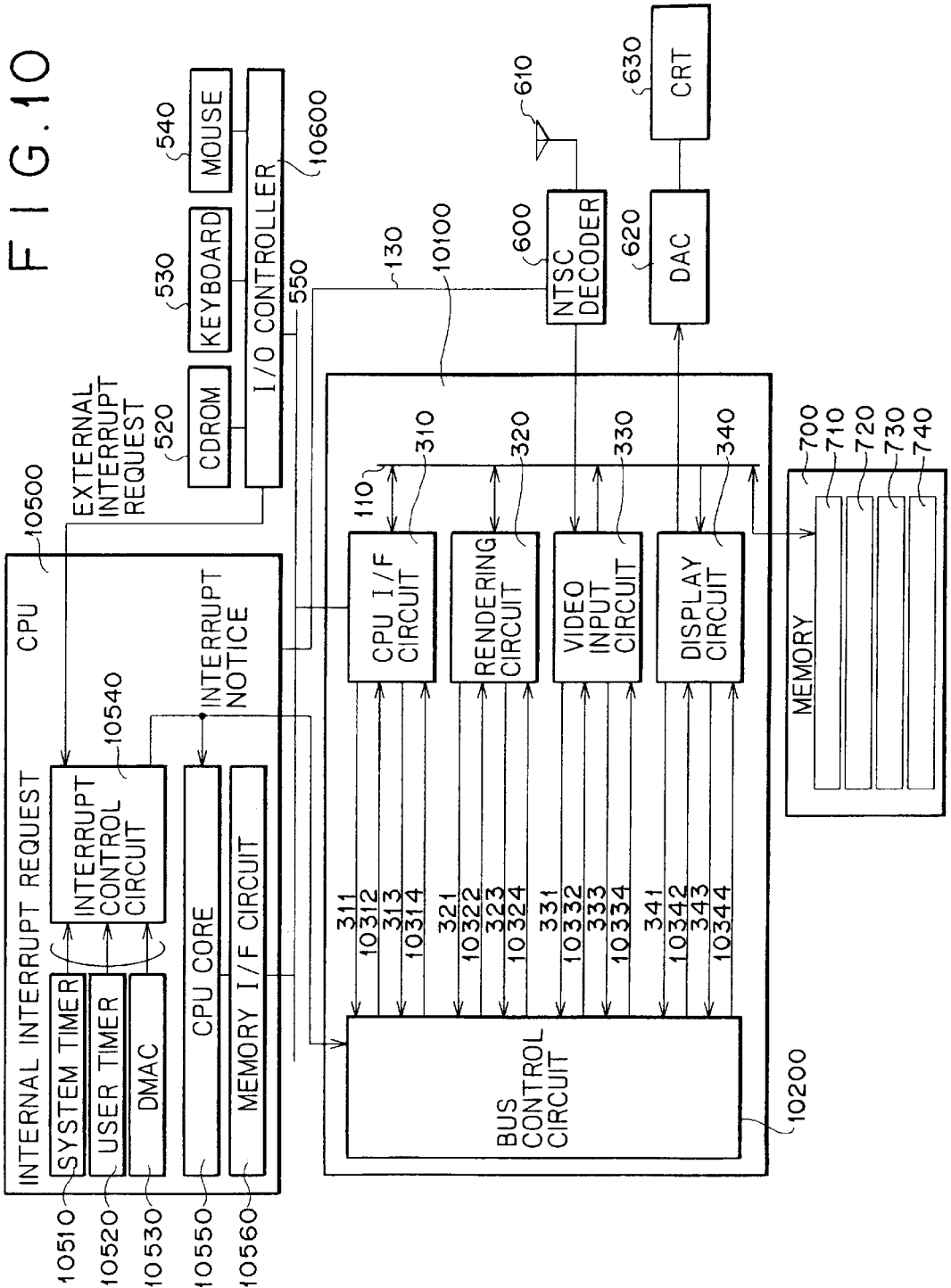
FIG. 10 is a block diagram showing an overall configuration of a second embodiment implementing the picture processing apparatus provided by the present invention.

FIG. 10 is a diagram showing an overall configuration of a second embodiment implementing the picture processing apparatus provided by the present invention. In the figure, reference numerals 10100 and 10200 denote a graphic processor and a bus control circuit, respectively. Reference numeral 10500 denotes a CPU and reference numeral 10510 denotes a system timer. Reference numerals 10520 and 10530 denote a user timer and a DMAC (Direct Memory Access Controller), respectively. Reference numeral 10540 denotes an interrupt control circuit and reference numeral 10550 denotes a CPU core. Reference numerals 10560 and 10600 denote a memory I/F circuit and an I/O controller, respectively. Reference numeral 530 denotes a keyboard and reference numeral 540 denotes a mouse. Reference numeral 630 denotes a CRT.

In the picture processing circuit shown in FIG. 10, the interrupt control circuit 10540 receives internal interrupt requests from the system timer 10510, the user timer 10520 and the DMAC 10530, as well as an external interrupt request from the I/O controller 10600, outputting an interrupt notice to the CPU core 10550 and the bus control circuit 10200. The bus control circuit 10200 determines which of the CPU IF circuit 310, the rendering circuit 320, the video input circuit 330 and the display circuit 340 generating the internal-state signals 311, 321, 331 and 341, respectively, is to be given the highest priority to use the internal bus 110 for making an access to the memory unit 700 on the basis of the internal-state signals 311, 321, 331 and 341, as well as the interrupt notice with timing synchronized to the interrupt notice, and outputs priority judgment results 10312, 10322, 10332 and 10342 to the CPU IF circuit 310, the rendering circuit 320, the video input circuit 330 and the display circuit 340, respectively.

As described above, since it is the bus control circuit 10200 that determines which of the CPU IF circuit 310, the rendering circuit 320, the video input circuit 330 and the display circuit 340 generating the internal-state signals 311, 321, 331 and 341, respectively, is to be given the highest priority to use the internal bus 110 for making an access to the memory unit 700 with timing synchronized to the interrupt notice, the bus control circuit 10200 is capable of determining that the CPU I/F circuit 310 is to be given the highest priority to use the internal bus 110, that is, is capable of raising the priority level of the CPU 10500 to make an access to the memory unit 700 in response to an interrupt request made by a peripheral circuit internal or external to the CPU 10500. For example, when the system timer 10510 generates an interrupt request upon detection of a run-away state of the CPU core 10550, the bus control circuit 10200 is able to raise the priority of the CPU I/F circuit 310 to the highest level when an interrupt notice is received from the interrupt control circuit 10540, allowing processing to recover the run-away state of the CPU 10500 to be carried out immediately. In the typical configuration shown in FIG. 10, an interrupt notice is output by the CPU 10500 to the graphic processor 10100 through a special pin. It should be noted, however, that the CPU 10500 is also capable of outputting the interrupt notice to the graphic processor 10100 by way of the CPU bus 550 in accordance with an access protocol adopted for making an access to the graphic processor 10100.

Figure 11:
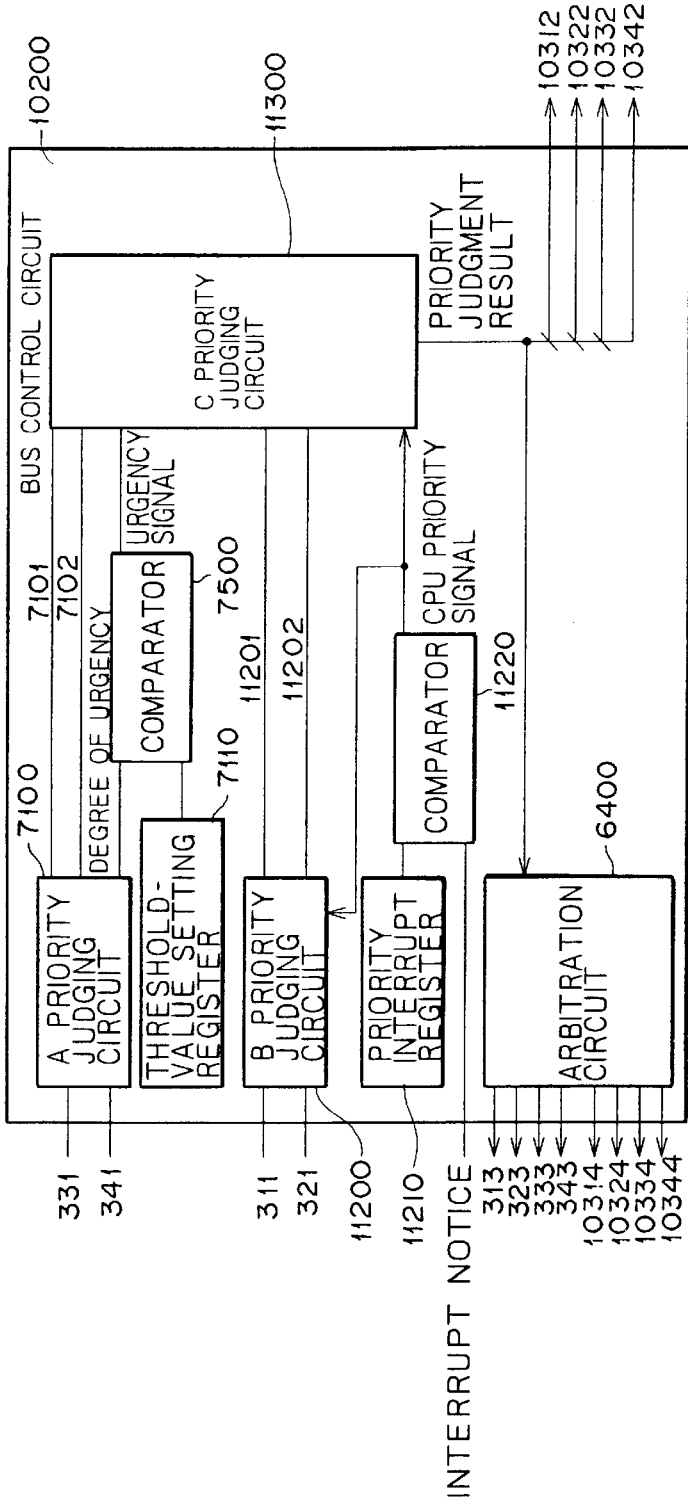
FIGS. 11A and 11B are block diagrams showing a typical configuration of a bus control circuit 10200 employed in the second embodiment.

FIGS. 11A and 11B are diagrams showing a typical configuration of the bus control circuit 10200 employed in the second embodiment shown in FIG. 10. In FIG. 11A, reference numerals 11200 and 11210 denote a B priority judging circuit and a priority interrupt register, respectively. Reference numeral 11220 denotes a comparator and reference numeral 11300 denotes a C priority judging circuit.

The priority interrupt register 11210 employed in the bus control circuit 10200 shown in FIG. 11A is a register used for holding a code representing processing to be carried out at the highest priority level at an interrupt request made by the CPU I/F circuit 310 to use the internal bus 110 among priority levels associated with interrupt notices output by the CPU 10500. The comparator 11220 compares the contents of the priority interrupt register 11210 with the interrupt notice, outputting a CPU priority signal with a logic value of "1" if the contents match the interrupt notice. Otherwise, the comparator 11220 outputs the CPU priority signal at a logic value of "0". The internal-state signals 311 and 321 generated by the CPU I/F circuit 310 and the rendering circuit 320, respectively, are supplied to the B priority judging circuit 11200 to be compared thereby. If the CPU priority signal has the logic value of "0", the B priority judging circuit 11200 outputs either of the internal-state signals 311 and 321 having the larger value to the C priority judging circuit 11300 as a signal 11201 representing a first priority circuit. The other internal-state signal is output as a signal 11202 representing a second priority circuit. If the CPU priority signal has the logic value of "1", on the other hand, the B priority judging circuit 11200 outputs the internal-state signal 311 generated by the CPU I/F circuit 310 to the C priority judging circuit 11300 as the signal 11201 representing a first priority circuit. The other internal-state signal 321 generated by the rendering circuit 320 is output as the signal 11202 representing a second priority circuit. The CPU priority signal is also supplied to the C priority judging circuit 11300 in addition to the urgency signal which has been described earlier by referring to FIG. 7A. The C priority judging circuit 11300 outputs results 10312, 10322, 10332 and 10342 of a judgment on the priority levels indicating that the priority-circuit signals 7101, 7102, 11201 and 11202 represent circuits with first, second, third and fourth priority levels, respectively, in accordance with the CPU priority signal and the urgency signal as shown in FIG. 11B. The results 10312, 10322, 10332 and 10342 are also supplied to the arbitration circuit 6400.

Figure 12:
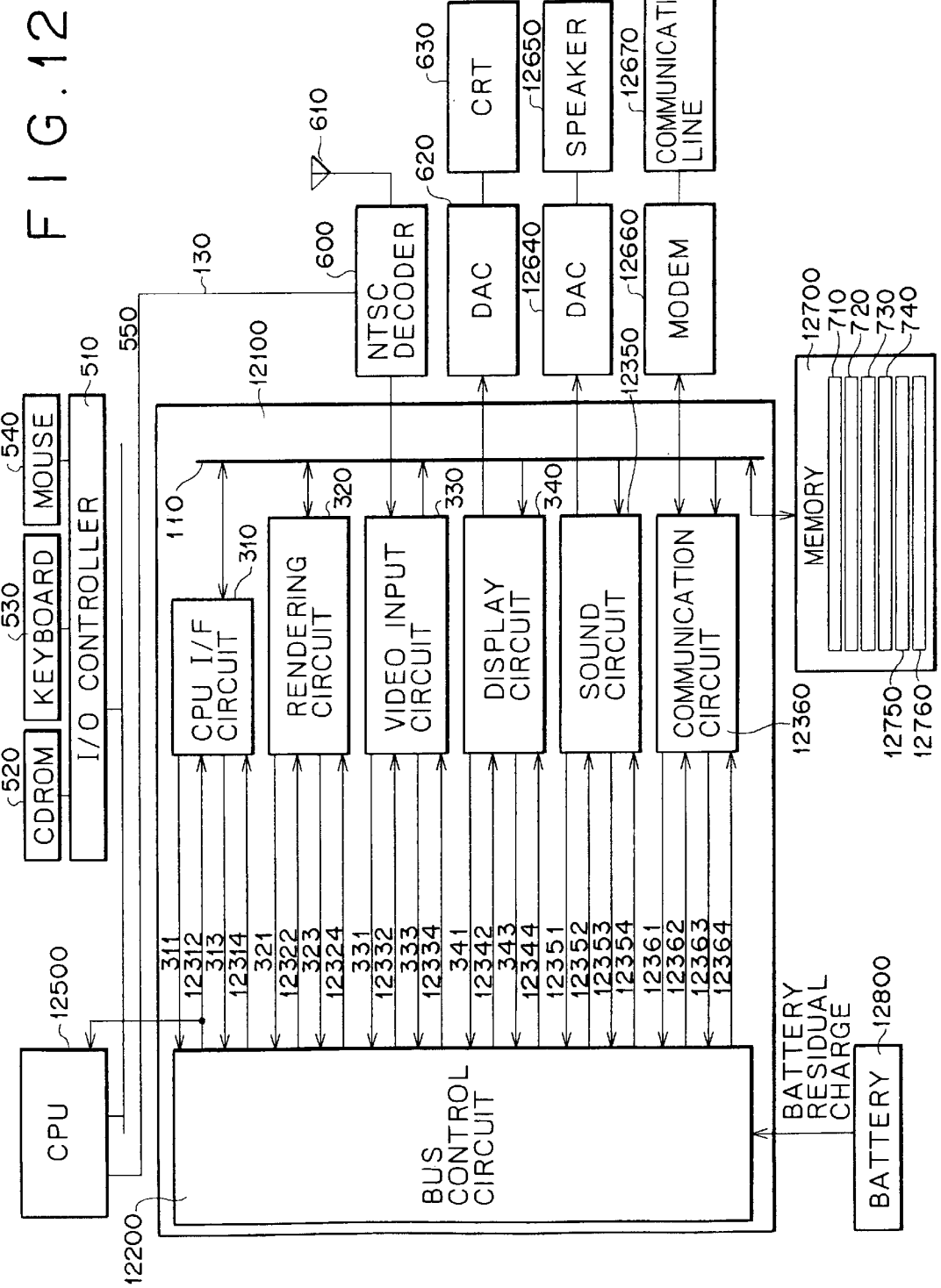
FIG. 12 is a block diagram showing an overall configuration of a third embodiment implementing the picture processing apparatus provided by the present invention.

FIG. 12 is a diagram showing an overall configuration of a third embodiment implementing the picture processing apparatus provided by the present invention. In the figure, reference numerals 12100 and 12200 denote a graphic processor and a bus control circuit, respectively. Reference numeral 12350 denotes a sound circuit and reference numeral 12360 denotes a communication circuit. Reference numerals 12500 and 12640 denote a CPU and a DAC, respectively. Reference numeral 12650 denotes a speaker and reference numeral 12660 denotes a modem. Reference numerals 12670 and 12700 denote a communication line and a memory unit, respectively. Reference numeral 12800 denotes a battery.

In the picture processing apparatus shown in FIG. 12, the bus control circuit 12200 determines which of the CPU IF circuit 310, the rendering circuit 320, the video input circuit 330, the display circuit 340, the sound circuit 12350 and the communication circuit 12360 generating the internal-state signals 311, 321, 331, 341, 12351 and 12361, respectively, is to be given the highest priority to use the internal bus 110 for making an access to the memory unit 700 on the basis of the internal-state signals 311, 321, 331, 341, 12351 and 12361, as well as information on battery residual electric charge received from the battery 12800 with proper timing, and outputs priority judgment results 12312, 12322, 12332, 12342, 12352 and 12362 to the CPU IF circuit 310, the rendering circuit 320, the video input circuit 330, the display circuit 340, the sound circuit 12350 and the communication circuit 12360, respectively. The priority judgment result 12312 is also supplied to the CPU 12500. The priority judgment results 12312, 12322, 12332, 12342, 12352 and 12362 also include information on memory access methods. The CPU IF circuit 310, the rendering circuit 320, the video input circuit 330, the display circuit 340, the sound circuit 12350 and the communication circuit 12360 then determine a way to make an access to the memory unit 700 in accordance with the information on memory access methods which is included in the priority judgment results 12312, 12322, 12332, 12342, 12352 and 12362 and which varies in dependence on the information on residual electric charge in the battery 12800.

As described above, the bus control circuit 12200 determines which of the CPU IF circuit 310, the rendering circuit 320, the video input circuit 330, the display circuit 340, the sound circuit 12350 and the communication circuit 12360 generating the internal-state signals 311, 321, 331, 341, 12351 and 12361, respectively, is to be given the highest priority to use the internal bus 110 for making an access to the memory unit 700 on the basis of the internal-state signals 311, 321, 331, 341, 12351 and 12361, as well as information on battery residual electric charge received from the battery 12800, and outputs priority judgment results 12312, 12322, 12332, 12342, 12352 and 12362 to the CPU IF circuit 310, the rendering circuit 320, the video input circuit 330, the display circuit 340, the sound circuit 12350 and the communication circuit 12360, respectively, with the priority judgment result 12312 also being supplied to the CPU 12500. Thus, the priority to use the internal bus 110 for making an access to the memory unit 700 can be controlled in accordance with the residual electric charge in the battery 12800. As a result, the use of the internal bus 110 for making an access to the memory unit 700 can be controlled so as to reduce the amount of power consumption when the information received from the battery 12800 indicates a low battery residual electric charge. In the typical configuration shown in FIG. 12, an interrupt notice is output by the CPU 12500 to the graphic processor 12100 through a special pin. It should be noted, however, that the CPU 12500 is also capable of outputting the interrupt notice to the graphic processor 12100 by way of the CPU bus 550 in accordance with an access protocol adopted for making an access to the graphic processor 12100.

Figure 13:
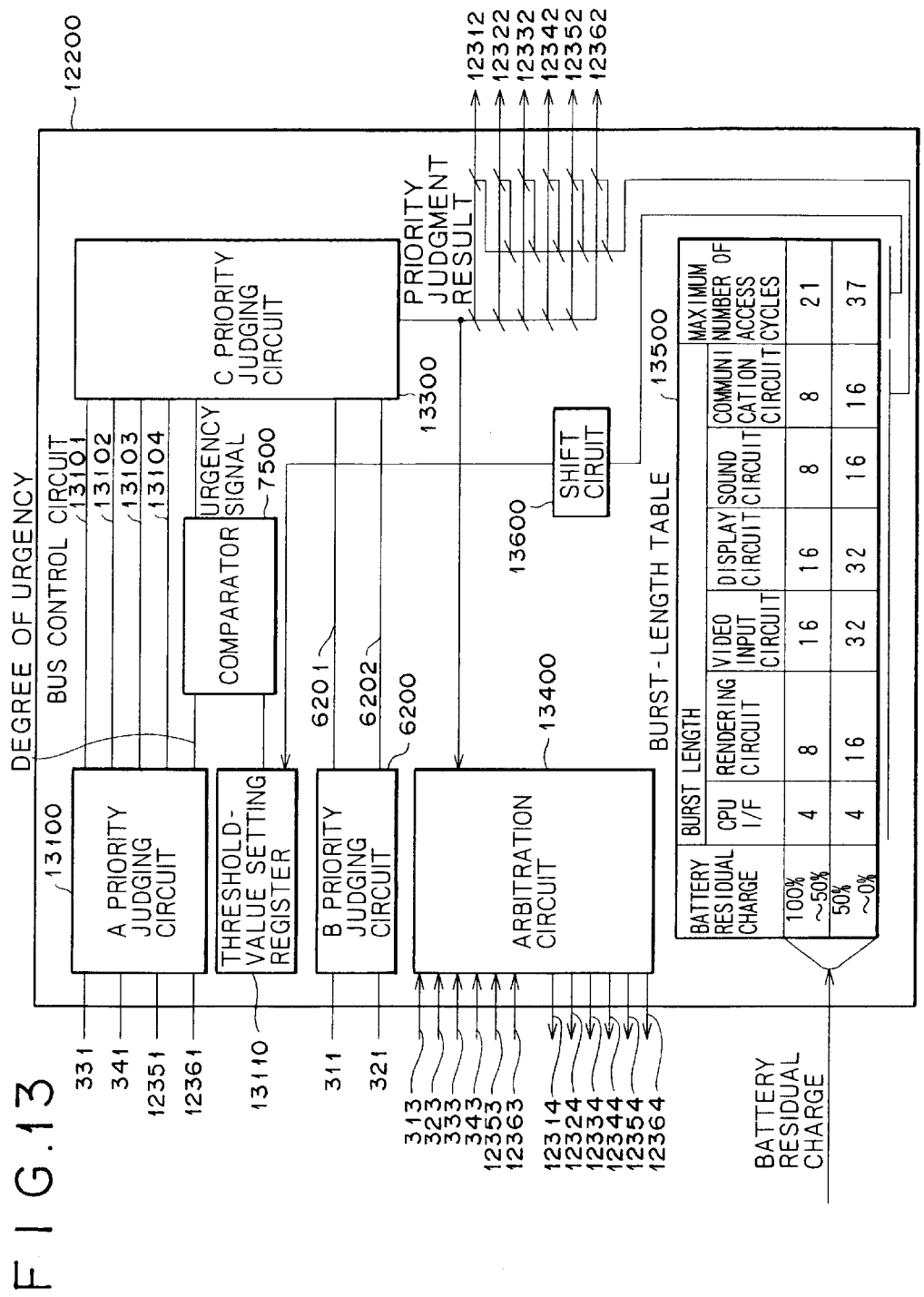
FIG. 13 is a block diagram showing a first typical configuration of a bus control circuit 12200 employed in the third embodiment.

FIG. 13 is a diagram showing a first typical configuration of the bus control circuit 12200 employed in the third embodiment shown in FIG. 12. In the figure, reference numerals 13100 and 13110 denote an A priority judging circuit and a threshold-value setting register, respectively. Reference numeral 13300 denotes a C priority judging circuit and reference numeral 13400 denotes an arbitration circuit. Reference numerals 13500 and 13600 denote a burst-length table and a shift circuit, respectively.

In the bus control circuit 12200 shown in FIG. 13, the internal-state signal 331 generated by the video input circuit 330, the internal-state signal 341 generated by the display circuit 340, the internal-state signal 12351 generated by the sound circuit 12350 and the internal-state signal 12361 generated by the communication circuit 12360 are supplied to the A priority judging circuit 13100 so as to be compared with each other. As a result of the comparison, priority levels are assigned to the internal-state signals 331, 341, 12351 and 12361 with the levels rising in inverse proportion to the values of the internal-state signals 331, 341, 12351 and 12361, and first, second, third and fourth priority-circuit signals 13101, 13102, 13103 and 13104 representing the priority levels in a decreasing order are output to the C priority judging circuit 13300. In addition, the A priority judging circuit 13100 outputs the internal-state signal 331, 341, 12351 or 12361 having a minimum value to the comparator 7500 as a signal indicating the degree of urgency. Like the bus control circuit shown in FIG. 7A, the signal representing the degree of urgency generated by the A priority judging circuit 13100 is compared with the contents of the threshold-value setting register 13110 by the comparator 7500. If the former is found to be smaller than the latter, the comparator 7500 outputs an urgency signal with a logic value of "1" to the C priority judging circuit 13300. Otherwise, the comparator 7500 outputs the urgency signal at a logic value of "0". In addition, the B priority judging circuit 6200 outputs the priority-circuit signals 6201 and 6202 as a result of comparison of the internal-state signal 311 generated by the CPU I/F circuit 310 with the internal-state signal 321 generated by the rendering circuit 320. If the urgency signal has the logic value of "1", the C priority judging circuit 13300 outputs results of a judgment on the priority levels indicating that the priority-circuit signals 13101, 13102, 13103, 13104, 6201 and 6202 represent circuits with first, second, third, fourth, fifth and sixth priority levels respectively. If the urgency signal has the logic value of "0", on the other hand, the C priority judging circuit 13300 outputs the results of the judgment on the priority levels indicating that the priority-circuit signals 6201, 6202, 13101, 13102, 13103 and 13104 represent circuits with first, second, third, fourth, fifth and sixth priority level, respectively, swapping a set comprising the priority-circuit signals 13101 to 13104 with a pair comprising the priority-circuit signals 6201 and 6202. The results of the judgment on the priority levels are also output to the arbitration circuit 13400. The burst-length table 13500 holds information on burst lengths at which the CPU/IF circuit 310, the rendering circuit 320, the video input circuit 330, the display circuit, the sound circuit 12350 and the communication circuit 12360 make access to the memory unit 700. As shown in the burst-length table 13500, the burst lengths vary with the amount of residual electric charge in the battery 12800. To be more specific, an access to the memory unit 700 is made at a larger burst length so as to reduce the amount of power consumption when the information obtained from the battery 12800 indicates a small amount of battery residual electric charge left in, the battery 12800, as will be described later by referring with reference to FIG. 14. Burst-lengths and a maximum number of access cycles recorded in the burst-length table 13500 are selected in accordance with information on residual electric charge received from the battery 12800. The burst lengths are combined with the results of the judgment on the priority levels output by the C priority judging circuit 13300 to generate final priority judgment results 12312, 12322, 12332, 12342, 12352 and 123362. The maximum number of access cycles is supplied to the shift circuit 13600 to be doubled thereby before being fed to the threshold-value setting register 13110 to update a threshold value held in the threshold-value setting register 13110.

As described above, burst-lengths recorded in the burst-length table 13500 are selected in accordance with information on residual electric charge received from the battery 12800 and included in the final priority judgment results 12312, 12322, 12332, 12342, 12352 and 123362. As a result, the memory unit 700 can be accessed in such a way that the amount of power consumption is reduced when the information received from the battery 12800 indicates a small amount of residual electric charge left in the battery 12800. In addition, since the threshold value held in the threshold-value setting register 13110 is updated by using a maximum number of access cycles obtained from the burst-length table 13500, circuits that each have to always complete their processing within a prescribed time are assured to be able to make as many accesses to the memory unit 700 as required to complete the processing within the prescribed time even if a plurality of such circuits do exist.

FIGS. 14A and 14B are diagrams showing breakdowns of commands to make accesses to the memory unit 700 to read out data at burst lengths of 8 and 16, respectively. In each of the figures, commands are issued to read out 16 pieces of data D0 to D15.

To be more specific, FIG. 14A shows a case in which the burst length is 8. In this case, since 8 pieces of data are read out in 1 burst access, 2 burst accesses need to be made to read out 16 pieces of data. 1 burst access includes 1 bank-active state Act, 8 column addresses and 1 precharge Pre. Thus, in order to read out the 16 pieces of data D0 to D15, 2 bank-active states, 16 column addresses C0 to C15 and 2 precharges are required.

On the other hand, FIG. 14B shows a case in which the burst length is 16. In this case, since the 16 pieces of data D0 to D15 can be read out in 1 burst access, 1 burst access is sufficient. The burst access includes 1 bank-active state Act, 16 column addresses C0 to C15 and 1 precharge Pre. At a burst length of 16, 1 bank-active command and 1 precharge command can be eliminated in comparison with the burst length of 8. Thus, the number of times the internal bus 110 is driven decreases and, as a result, the amount of power consumption can also be reduced as well. In addition, it is also unnecessary for the memory unit 700 to execute the eliminated bank-active and precharge commands so that the amount of power consumption can also be reduced in the memory unit 700 itself.

Figure 15:
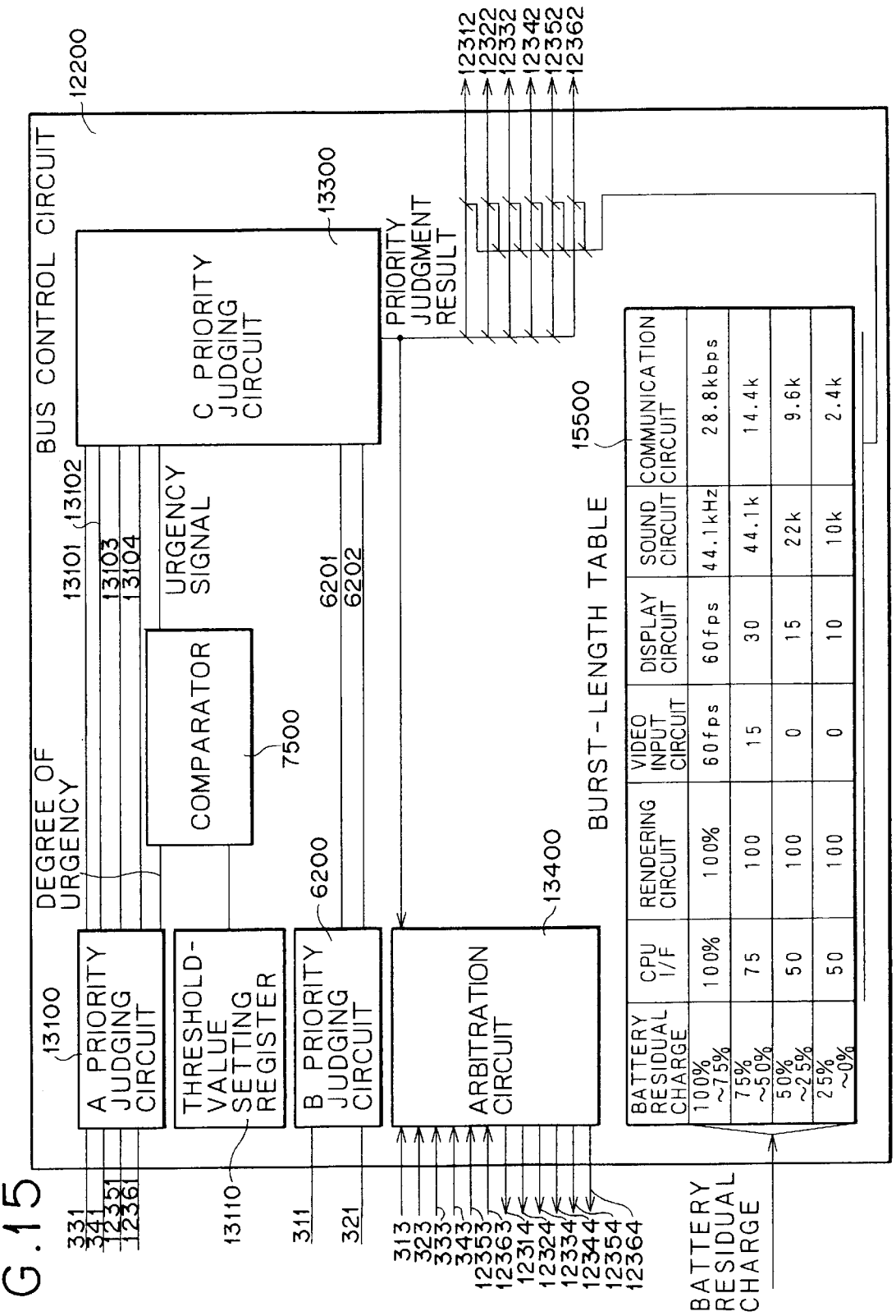
FIG. 15 is a block diagram showing a second typical configuration of the bus control circuit 12200 employed in the third embodiment.

FIG. 15 is a diagram showing a second typical configuration of the bus control circuit 12200 shown in FIG. 12. In FIG. 15, reference numeral 15500 denotes an operating-mode table.

The operating-mode table 15500 employed in the bus control circuit 12200 shown in FIG. 15 is used for storing operating modes of the CPU/IF circuit 310, the rendering circuit 320, the video input circuit 330, the display circuit 340, the sound circuit 12350 and the communication circuit 12360 for different amounts of residual electric charge in the battery 12800. In each operating mode, the operating-mode table 15500 shows an operating clock of the CPU 12500 for the CPU I/F circuit 310, an operating clock for the rendering circuit 320, a frame rate of an input video screen for the video input circuit 330, a frame rate of a screen displayed on the CRT 630 for the display circuit 340, a sampling frequency of a generated sound for the sound circuit 12350 and a communication speed of the modem 12660 for the communication circuit 12360. With regard to the CPU 12500, the operating clock is set at a typical frequency of 50 MHz for a full amount of electric charge in the battery 12800. As the amount of electric charge decreases to values in the ranges 75% to 50%, 50% to 25% and 25% to 0% of the full amount, the operating clock is reduced to frequencies of 37.5 MHz, 25 MHz and 25 MHz, respectively. An operating mode in the operating-mode table 15500 is selected for the CPU/IF circuit 310, the rendering circuit 320, the video input circuit 330, the display circuit 340, the sound circuit 12350 and the communication circuit 12360 in accordance with information on the amount of residual electric charge received from the battery 12800 and combined with the results of the judgment on the priority levels output by the C priority judging circuit 13300 to generate the final priority judgment results 12312, 12322, 12332, 12342, 12352 and 12362.

As described above, an operating mode in the operating-mode table 15500 is selected for the CPU/IF circuit 310, the rendering circuit 320, the video input circuit 330, the display circuit 340, the sound circuit 12350 and the communication circuit 12360 in accordance with information on the amount of residual electric charge and included in the final priority judgment results 12312, 12322, 12332, 12342, 12352 and 12362, so that it is possible to control the operations of the CPU/IF circuit 310, the rendering circuit 320, the video input circuit 330, the display circuit 340, the sound circuit 12350 and the communication circuit 12360 so as to gradually reduce the amount of electric power consumed by them in order to reduce the amount of electric charge drawn from the battery 12800 as the amount of residual electric charge decreases with the lapse of time. By executing such control, the functions of the CPU/IF circuit 310, the rendering circuit 320, the video input circuit 330, the display circuit, the sound circuit 12350 and the communication circuit 12360 can be gradually limited so as to prevent specific circuits from becoming not functional all of a sudden. As a result, more convenience benefits the user.

Figure 16:
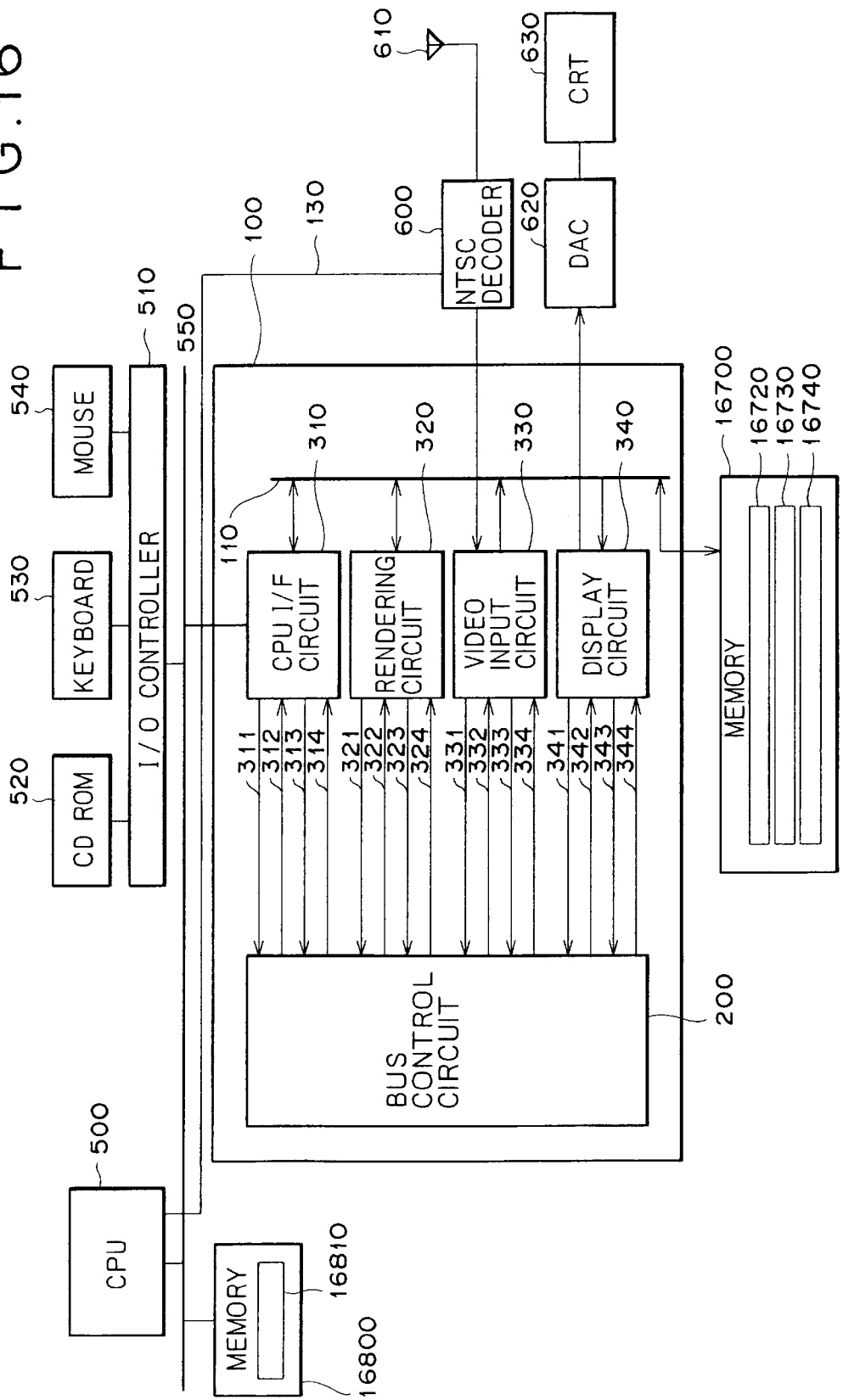
FIG. 16 is a block diagram showing an overall configuration of a fourth embodiment implementing the picture processing apparatus provided by the present invention.

FIG. 16 is a diagram showing an overall configuration of a fourth embodiment implementing the picture processing apparatus provided by the present invention. In the figure, reference numerals 16700 and 16800 each denote a memory unit.

In the picture processing apparatus shown in FIG. 16, the memory unit 16800 is a memory unit including a main memory 16810, whereas the memory unit 16700 is a memory including a storage area 16720 for storing rendering data, a storage area 16730 for storing video input data and a frame buffer 16740. Also in such a configuration, the bus control circuit 200 arbitrates contentions for the use of the internal bus 110 to make an access to the memory unit 16700 by determining which of the CPU/IF circuit 310, the rendering circuit 320, the video input circuit 330 and the display circuit 340 is to be given the highest priority to use the internal bus 110 on the basis of the internal-state signals 311, 321, 331 and 341 generated by the CPU/IF circuit 310, the rendering circuit 320, the video input circuit 330, the display circuit 340, respectively, so that circuits that each have to always complete their processing within a prescribed time are assured to be able to make as many accesses to the memory unit 16700 as required to complete the processing within the prescribed time even if a plurality of such circuits do exist.

Figure 17:
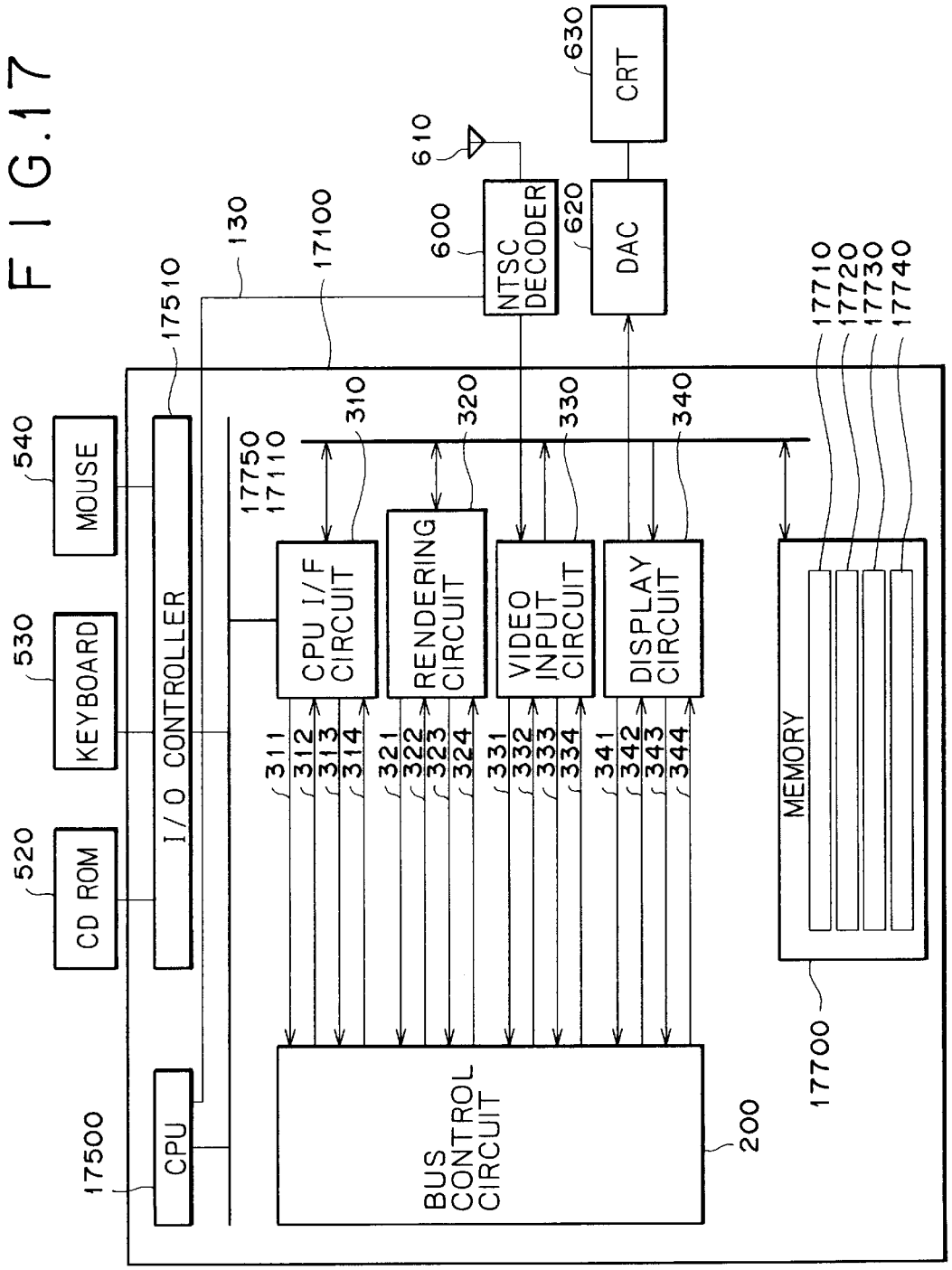
FIG. 17 is a block diagram showing an overall configuration of a fifth embodiment implementing the picture processing apparatus provided by the present invention.

FIG. 17 is a diagram showing the overall configuration of a fifth embodiment implementing the picture processing apparatus provided by the present invention. In the figure, reference numerals 17100 and 17500 denote a graphic processor and a CPU, respectively. Reference numeral 17510 denotes an I/O controller and reference numeral 17700 denotes a memory unit.

In the picture processing apparatus shown in FIG. 17, the graphic processor 17100, the CPU 17500, the I/O controller 17510 and the memory unit 17700 are integrated to form a single chip. By designing those components into a single chip in this way, the operating frequency and the width of the memory bus 17110 can be increased, allowing the throughput of the memory 17700 to be improved. However, it is still quite within the bounds of possibility that the video input circuit 330 and the display circuit 340 will make requests to use the memory bus 17110 at the same time, making one of them incapable of making an access to the memory 17700. In this case, however, the bus control circuit 200 arbitrates contentions for the use of the memory bus 17110 to make an access to the memory 17700 by determining which of the circuits is to be given the highest priority to use the memory bus 17110 on the basis of the internal-state signals generated by the circuits so that circuits that each have to always complete their processing within a prescribed time are assured to be able to make as many accesses to the memory 17700 as required to complete the processing within the prescribed time even if a plurality of such circuits do exist.

Figure 18:
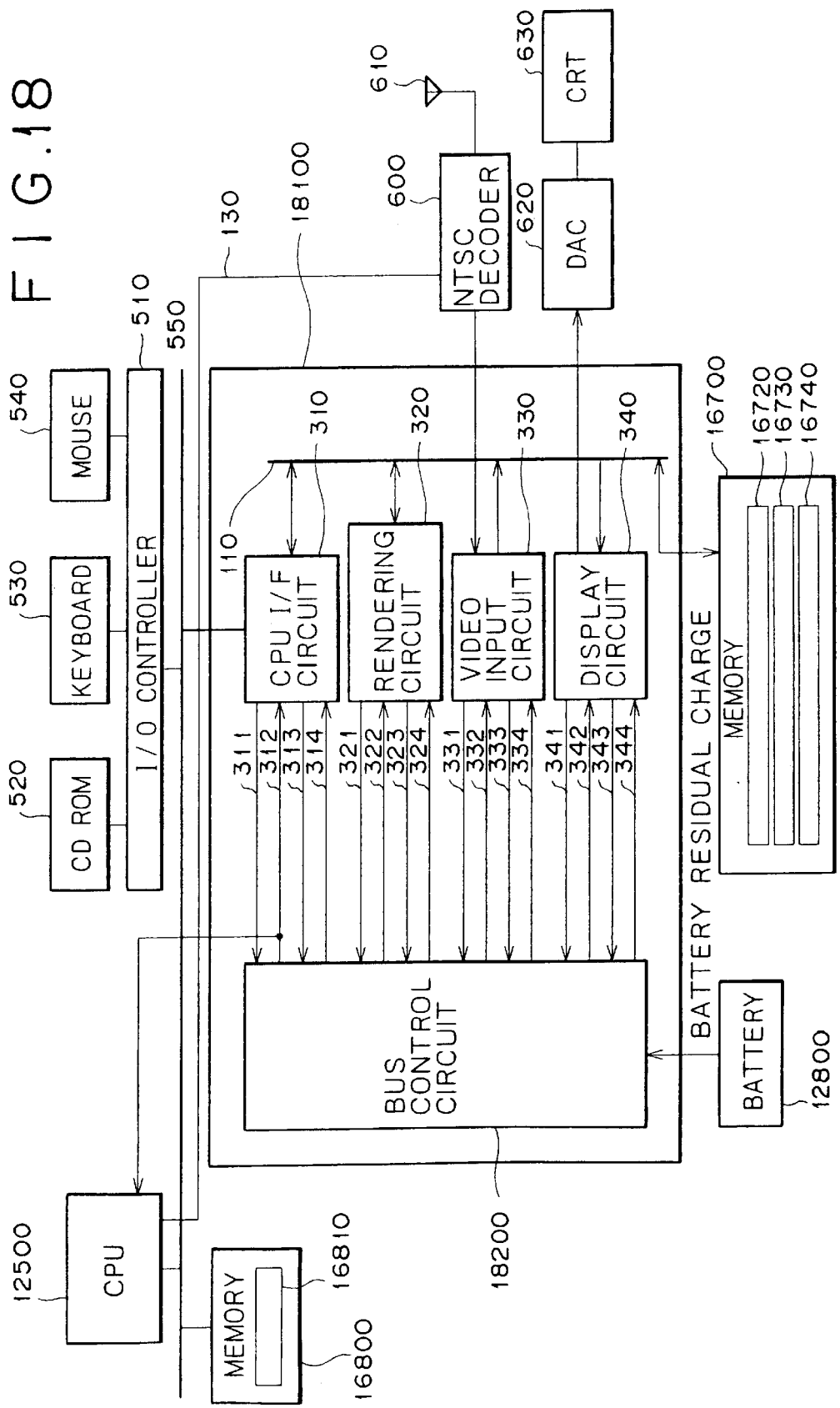
FIG. 18 is a block diagram showing an overall configuration of a sixth embodiment implementing the picture processing apparatus provided by the present invention.

FIG. 18 is a diagram showing the overall configuration of a sixth embodiment implementing the picture processing apparatus provided by the present invention. In the figure, reference numerals 18100 and 18200 denote a graphic processor and a bus control circuit, respectively.

In the picture processing apparatus shown in FIG. 18, the bus control circuit 18200 arbitrates contentions for the use of the internal bus 110 to make an access to the memory unit 16700 by determining which of the CPU/IF circuit 310, the rendering circuit 320, the video input circuit 330 and the display circuit 340 is to be given the highest priority to use the internal bus 110 on the basis of the internal-state signals 311, 321, 331 and 341 generated by the CPU/IF circuit 310, the rendering circuit 320, the video input circuit 330, the display circuit 340, respectively, as well as information on the amount of residual electric charge received from the battery 12800, outputting results of a judgment on priority levels including information on methods of making an access to the memory unit 16700. With such a configuration, priority levels to use the internal bus 110 can be controlled in accordance with the amount of residual electric charge in the battery 12800, allowing accesses to the internal bus 110 to be controlled so as to reduce the amount of power consumption as the amount of residual electric charge in the battery 12800 decreases with the lapse of time. In the typical configuration shown in FIG. 18, an interrupt notice is output by the CPU 12500 to the graphic processor 18100 through a special pin. It should be noted, however, that the CPU 12500 is also capable of outputting the interrupt notice to the graphic processor 18100 by way of the CPU bus 550 in accordance with an access protocol adopted for making an access to the graphic processor 18100.

Figure 19:
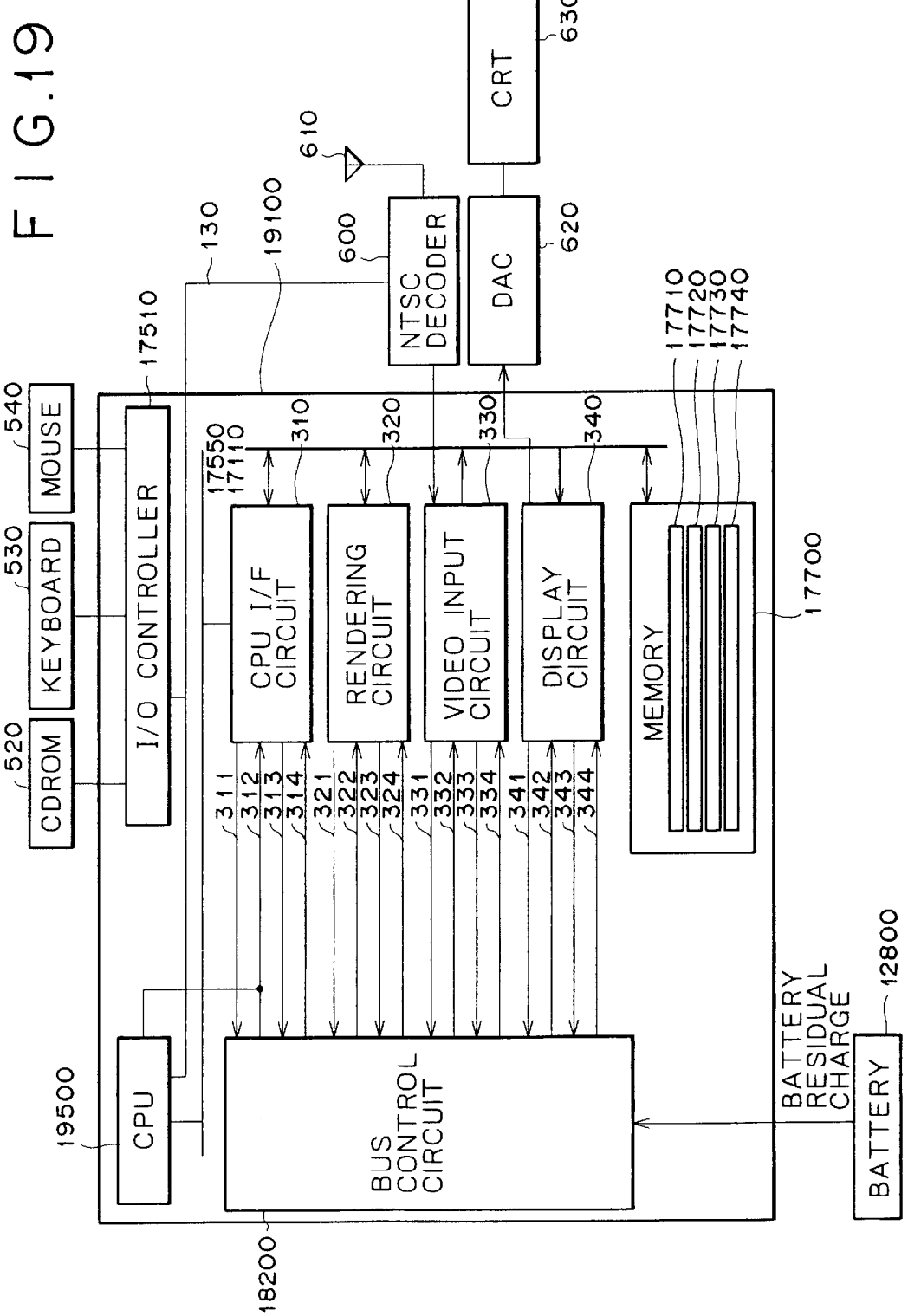
FIG. 19 is a block diagram showing an overall configuration of a seventh embodiment implementing the picture processing apparatus provided by the present invention.

FIG. 19 is a diagram showing the overall configuration of a seventh embodiment implementing the picture processing apparatus provided by the present invention. In the figure, reference numerals 19100 and 19500 denote a graphic processor and a CPU, respectively.

In the picture processing apparatus shown in FIG. 19, the graphic processor 19100, the CPU 19500, the I/O controller 17510 and the memory unit 17700 are integrated to form a single chip. By designing those components into a single chip in this way, unlike the case where the graphic processor 19100, the CPU 19500 and the memory unit 17700 are made separately, it is not necessary to drive wires connecting a plurality of chips to each other so that the amount of power consumption can be reduced. In addition, the bus control circuit 18200 arbitrates contentions for the use of the internal bus 110 to make an access to the memory unit 17700 by determining which of the CPU/IF circuit 310, the rendering circuit 320, the video input circuit 330 and the display circuit 340 is to be given the highest priority to use the internal bus 110 on the basis of the internal-state signals 311, 321, 331 and 341 generated by the CPU/IF circuit 310, the rendering circuit 320, the video input circuit 330, the display circuit 340, respectively, as well as information on the amount of residual electric charge received from the battery 12800, outputting results of a judgment on priority levels including information on methods of making an access to the memory unit 17700. With such a configuration, priority levels to use the internal bus 110 can be controlled in accordance with the amount of residual electric charge in the battery 12800, allowing accesses to the internal bus 110 to be controlled so as to reduce the amount of power consumption as the amount of residual electric charge in the battery 12800 decreases with the lapse of time. In the typical configuration shown in FIG. 19, an interrupt notice is output by the CPU 19500 to the bus control circuit 18200 through a special wire. It should be noted, however, that the CPU 19500 is also capable of outputting the interrupt notice to the bus control circuit 18200 by way of a CPU bus 17550 in accordance with an access protocol adopted for making an access to the CPU I/F circuit 310.

According to the present invention described above, circuits that each have to always complete its processing within a prescribed time, such as the video input circuit 330 and the display circuit 340 employed in the graphic processor 100, are assured to be able to make as many accesses to the memory 17700 as required to complete the processing within the prescribed time even if a plurality of such circuits do exist.

What is claimed is:

1. A picture processing apparatus comprising:
   a CPU for carrying out processing;
   a memory for storing processing results produced by the CPU and for storing data to be displayed;
   a display control circuit for making accesses to the memory and for controlling an operation to display the data stored in the memory;
   a processing circuit for completing processing within a prescribed time by making accesses to the memory to read out the data to be displayed; and a bus control circuit for arbitrating a contention for an access to the memory between the display control circuit and the processing circuit;

wherein the display control circuit and the processing circuit each include means for outputting an internal-state signal representing an internal state thereof; and wherein the bus control circuit determines which of the display control circuit and the processing circuit is to be given a higher priority to make an access to the memory based on the internal-state signals output by the display control circuit and the processing circuit.

2. A picture processing apparatus according to claim 1, wherein the CPU outputs an interrupt request generated by a peripheral device embedded in the CPU or a peripheral device external to the CPU to the bus control circuit; and wherein the bus control circuit determines which of the display control circuit and the processing circuit is to be given a higher priority to make an access to the memory by using the interrupt request.

3. A picture processing apparatus according to claim 1, wherein the CPU outputs the interrupt request through a special pin.

4. A picture processing apparatus according to claim 1, wherein the CPU outputs the interrupt request in accordance with a bus-access protocol.

5. A picture processing apparatus according to claim 1, wherein the data to be displayed includes first display data of 16 bits per pixel and second display data of 8 bits per pixel; and wherein the display control circuit displays the second display data in any arbitrary shape on the first display data by overlapping the second display data on the first display data.

6. A picture processing apparatus according to claim 1, wherein the display control circuit controls part of the data to be displayed by using a linear address.

7. A picture processing apparatus according to claim 1, wherein the display control circuit controls part of the data to be displayed by using a data format based on a luminance signal and a chrominance signal.

8. A picture processing apparatus according to claim 1, wherein the processing circuit is a video input circuit for
inputting video data from an external source,
converting the format of the video data into a data format based on a luminance signal and a chrominance signal or an RGB data format, and
writing the video data with a converted data format into the memory.

9. A picture processing apparatus according to claim 8, wherein the video input circuit carries out thinning processing and interpolation processing on the video data before writing the video data into the memory.

10. A picture processing apparatus according to claim 1, wherein the CPU, the memory, the display control circuit, and the processing circuit are created on a same semiconductor substrate.

11. A picture processing apparatus according to claim 1, wherein the processing circuit is separate from the CPU.

12. A picture processing apparatus according to claim 1, wherein the display control circuit includes internal buffers;

wherein the internal-state signal output by the processing circuit indicates a minimum of estimated times in which the internal buffers of the display control circuit will become empty;

wherein the processing circuit includes an internal buffer; and wherein the internal-state signal output by the processing circuit indicates an estimated time in which the internal buffer of the processing circuit will be filled up with data.

13. A picture processing apparatus comprising:
a CPU for carrying out processing;
a first memory for storing processing results produced by the CPU;
a second memory for storing processing results produced by the CPU and for storing data to be displayed;
a display control circuit for making accesses to the second memory and for controlling an operation to display the data stored in the second memory;
a processing circuit for completing processing within a prescribed time by making accesses to the second memory to read out the data to be displayed; and
a bus control circuit for arbitrating a contention for an access to the second memory between the display control circuit and the processing circuit;

wherein the display control circuit and the processing circuit each include means for outputting an internal-state signal representing an internal state thereof; and wherein the bus control circuit determines which of the display control circuit and the processing circuit is to be given a higher priority to make an access to the second memory based on the internal-state signals output by the display control circuit and the processing circuit.

14. A picture processing apparatus according to claim 13, wherein the CPU outputs an interrupt request generated by a peripheral device embedded in the CPU or a peripheral device external to the CPU to the bus control circuit; and wherein the bus control circuit determines which of the display control circuit and the processing circuit is to be given a higher priority to make an access to the second memory by using the interrupt request.

15. A picture processing apparatus according to claim 13, wherein the CPU outputs the interrupt request through a special pin.

16. A picture processing apparatus according to claim 13, wherein the CPU outputs the interrupt request in accordance with a bus-access protocol.

17. A picture processing apparatus according to claim 13, wherein the data to be displayed includes first display data of 16 bits per pixel and second display data of 8 bits per pixel; and wherein the display control circuit displays the second display data in any arbitrary shape on the first display data by overlapping the second display data on the first display data.

18. A picture processing apparatus according to claim 13, wherein the display control circuit controls part of the data to be displayed by using a linear address.

19. A picture processing apparatus according to claim 13, wherein the display control circuit controls part of the data to be displayed by using a data format based on a luminance signal and a chrominance signal.

20. A picture processing apparatus according to claim 13, wherein the processing circuit is a video input circuit for
inputting video data from an external source,
converting the format of the video data into a data format based on a luminance signal and a chrominance signal or an RGB data format, and
writing the video data with a converted data format into the second memory.

21. A picture processing apparatus according to claim 20, wherein the video input circuit carries out thinning processing and interpolation processing on the video data before writing the video data into the second memory.

22. A picture processing apparatus according to claim 13, wherein the CPU, the second memory, the display control circuit, and the processing circuit are created on a same semiconductor substrate.

23. A picture processing apparatus according to claim 13, wherein the processing circuit is separate from the CPU.

24. A picture processing apparatus according to claim 13, wherein the display control circuit includes internal buffers;
   wherein the internal-state signal output by the processing circuit indicates a minimum of estimated times in which the internal buffers of the display control circuit will become empty;
   wherein the processing circuit includes an internal buffer; and
   wherein the internal-state signal output by the processing circuit indicates an estimated time in which the internal buffer of the processing circuit will be filled up with data.

25. A picture processing apparatus comprising:
   a CPU for carrying out processing;
   a memory for storing processing results produced by the CPU and for storing data to be displayed;
   a battery used for operating the CPU; and
   a graphic processor connected between the CPU and the memory;
   wherein the graphic processor includes a rendering unit for generating the data to be displayed; and
   wherein the graphic processor controls controlling timing to write the processing results produced by the CPU and the data to be displayed into the memory in accordance with an amount of residual electric charge in the battery.

26. A picture processing apparatus comprising:
   a CPU for carrying out processing;
   a memory for storing processing results produced by the CPU and for storing data to be displayed;
   a battery used at least for operating the CPU; and
   a graphic processor connected to the CPU by a first signal line, to the memory by a second signal line, to a third signal line for exchanging a signal with an external component, and to the battery by a fourth signal line;
   wherein the graphic processor includes a rendering unit for generating the data to be displayed; and
   wherein the graphic processor determines priority levels for writing or reading out the results produced by the CPU, the data to be displayed, and the signal exchanged with the external component into or from the memory in accordance with an amount of residual electric charge in the battery, and makes accesses to the memory based on the priority levels.

27. In a picture processing method adopted in a picture processing apparatus for at least writing generated data to be displayed which is generated by an instruction issued by a CPU and a video or audio signal received from an external source into a memory, and reading out the generated data to be displayed or the video or audio signal from the memory in order to display the generated data to be displayed or the video or audio signal,
   the improvement wherein a priority to write or read out the generated data to be displayed or the video or audio signal into and from the memory is changed in accordance with an amount of residual electric charge in a battery used for operating the CPU.

28. A picture processing system comprising:
   a display unit for displaying a picture; and
   a processing unit for generating data for displaying a picture on the display unit;
   wherein the processing unit includes:
      a CPU for executing processing;
      a memory for storing results of processing carried out by the CPU and for storing data for displaying a picture on the display unit;
      a display control circuit for outputting data used for displaying a picture and stored in the memory to the display unit;
      a picture generating circuit for generating data for displaying a picture and storing the data into the memory in accordance with an instruction issued by the CPU;
      a video input circuit for inputting a video signal from an external source and storing the video signal into the memory; and
      a control circuit for controlling accesses to the memory made by the display control circuit, the picture generating circuit, and the video input circuit;
   wherein the display control circuit includes
      internal buffers, and
      means for outputting an internal-state signal indicating a minimum of estimated times in which the internal buffers of the display control circuit will become empty;
   wherein the video input circuit includes
      an internal buffer which stores video data obtained from the video signal, and
      means for outputting an internal-state signal indicating an estimated time in which the internal buffer of the video input circuit will be filled up with video data; and
   wherein the control circuit controls accesses to the memory made by the display control circuit, the picture generating circuit, and the video input circuit based on the internal-state signal output by the display control circuit and the internal-state signal output by the video input circuit.

29. A picture processing system according to claim 28, wherein the display control circuit displays data generated by the picture generating circuit and a video signal input by the video input circuit on the display unit.

30. A picture processing system according to claim 28, wherein the picture generating unit and the video input circuit are separate from the CPU.

31. A picture processing system comprising:
   a first display unit and a second display unit each for displaying a picture; and
   a processing unit for generating data for displaying pictures on the first display unit and the second display unit;
   wherein the processing unit includes:
      a CPU for executing processing;
      a memory for storing results of processing carried out by the CPU and for storing data for displaying pictures on the first display unit and the second display unit;
      a display control circuit for outputting data used for displaying pictures and stored in the memory to the first display unit and the second display unit;
      a picture generating circuit for generating data for displaying a picture and storing the data into the memory in accordance with an instruction issued by the CPU;

a video input circuit for inputting a video signal from an external source and storing the video signal into the memory; and a control circuit for controlling accesses to the memory made by the display control circuit, the picture generating circuit, and the video input circuit;

wherein the display control circuit includes internal buffers, and means for outputting an internal-state signal indicating a minimum of estimated times in which the internal buffers of the display control circuit will become empty;

wherein the video input circuit includes an internal buffer which stores video data obtained from the video signal, and means for outputting an internal-state signal indicating an estimated time in which the internal buffer of the video input circuit will be filled up with video data; and wherein the control circuit controls accesses to the memory made by the display control circuit, the picture generating circuit, and the video input circuit based on the internal-state signal output by the display control circuit and the internal-state signal output by the video input circuit.

32. A picture processing system according to claim 31, wherein the display control circuit displays data generated by the picture generating circuit on the first display unit, and displays a video signal input by the video input circuit on the second display unit.

33. A picture processing system according to claim 31, wherein the picture generating unit and the video input circuit are separate from the CPU.

* * * * *